(12) United States Patent
Fukui et al.

(10) Patent No.: US 11,832,192 B2
(45) Date of Patent: Nov. 28, 2023

(54) RADIO BASE STATION, WIRELESS TERMINAL, RADIO COMMUNICATION SYSTEM, TRANSMISSION POWER CONTROLLING METHOD, CONTROL CIRCUIT AND PROGRAM STORAGE MEDIUM

(71) Applicant: MITSUBISHI ELECTRIC CORPORATION, Tokyo (JP)

(72) Inventors: Noriyuki Fukui, Tokyo (JP); Keijiro Take, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/679,988

(22) Filed: Feb. 24, 2022

(65) Prior Publication Data

US 2022/0248339 A1    Aug. 4, 2022

Related U.S. Application Data

(60) Division of application No. 16/944,719, filed on Jul. 31, 2020, now Pat. No. 11,297,578, and a
(Continued)

(51) Int. Cl.
*H04W 52/34* (2009.01)
*H04W 52/24* (2009.01)
*H04W 24/08* (2009.01)

(52) U.S. Cl.
CPC ......... *H04W 52/241* (2013.01); *H04W 24/08* (2013.01); *H04W 52/34* (2013.01)

(58) Field of Classification Search
CPC .... H04W 52/241; H04W 52/34; H04W 24/08
See application file for complete search history.

(56) References Cited

U.S. PATENT DOCUMENTS

| 8,731,555 B2 | 5/2014 | Yokoyama |
| 9,392,608 B2 | 7/2016 | Song et al. |
(Continued)

FOREIGN PATENT DOCUMENTS

CN    106797625 A    5/2017

OTHER PUBLICATIONS

3GPP TS 38. 213 V15.0.0 (Dec. 2017); 3rd Generation Partnership Project; Technical Specification Group Radio Access Network; NR; Physical layer procedures for control (Release 15); pp. 1-56.
(Continued)

*Primary Examiner* — Hai V Nguyen
(74) *Attorney, Agent, or Firm* — Birch, Stewart, Kolasch & Birch, LLP

(57) ABSTRACT

The present invention includes: a plurality of antenna sections, each of which to generate base station reception beams and to receive, by using the base station reception beams, one or more signals transmitted from a wireless terminal using one or more terminal transmission beams; a measurement unit that measures reception quality of each of the signals for each of the base station reception beams; and a control unit that groups the base station reception beams into groups in units of the antenna sections, and perform transmission power control on the terminal transmission beams of the wireless terminal in units of the groups, on the basis of a result of measurement of the measurement unit in units of the groups.

4 Claims, 12 Drawing Sheets

Related U.S. Application Data continuation of application No. 16/944,719, filed on Aug. 20, 2018.

(56) References Cited

U.S. PATENT DOCUMENTS

| | | | |
|---|---|---|---|
| 9,642,165 B2 | 5/2017 | Jung et al. | |
| 10,051,484 B2 | 8/2018 | Shen et al. | |
| 10,117,113 B2 | 10/2018 | Braun et al. | |
| 10,292,098 B2 | 5/2019 | Liu et al. | |
| 10,367,620 B2* | 7/2019 | Iyer | H04L 1/1861 |
| 10,484,066 B2 | 11/2019 | Subramanian et al. | |
| 10,524,244 B2 | 12/2019 | Tsai et al. | |
| 10,536,873 B2 | 1/2020 | Axén et al. | |
| 10,651,995 B2* | 5/2020 | Nam | H04L 5/0069 |
| 10,686,573 B2 | 6/2020 | Jung et al. | |
| 10,735,162 B2* | 8/2020 | Jung | H04B 7/063 |
| 10,827,530 B2 | 11/2020 | Hui et al. | |
| 10,868,653 B2* | 12/2020 | Iyer | H04L 5/0007 |
| 10,917,825 B2 | 2/2021 | Peisa et al. | |
| 10,925,116 B2 | 2/2021 | Zhang et al. | |
| 11,297,578 B2* | 4/2022 | Fukui | H04W 52/42 |
| 11,575,542 B2* | 2/2023 | Siomina | H04W 76/25 |
| 11,601,925 B2* | 3/2023 | Raghavan | H04L 5/0048 |
| 2013/0286960 A1 | 10/2013 | Li et al. | |
| 2014/0177561 A1 | 6/2014 | Yu et al. | |
| 2014/0185481 A1 | 7/2014 | Seol et al. | |
| 2015/0208443 A1 | 7/2015 | Jung et al. | |
| 2016/0337922 A1 | 11/2016 | Mustajarvi et al. | |
| 2017/0111868 A1 | 4/2017 | Dahlman et al. | |
| 2017/0332359 A1 | 11/2017 | Tsai et al. | |
| 2017/0366311 A1* | 12/2017 | Iyer | H04L 5/0007 |
| 2018/0070266 A1 | 3/2018 | Tomeba et al. | |
| 2019/0081675 A1* | 3/2019 | Jung | H04W 24/10 |
| 2019/0081753 A1 | 3/2019 | Jung et al. | |
| 2019/0089499 A1* | 3/2019 | Nam | H04L 5/0048 |
| 2019/0229789 A1 | 7/2019 | Zhang et al. | |
| 2019/0281588 A1 | 9/2019 | Zhang et al. | |
| 2019/0288809 A1* | 9/2019 | Iyer | H04L 1/1893 |
| 2019/0306924 A1 | 10/2019 | Zhang et al. | |
| 2020/0052847 A1* | 2/2020 | Manolakos | H04L 5/0048 |
| 2020/0067590 A1* | 2/2020 | Wang | H04W 52/365 |
| 2020/0084754 A1 | 3/2020 | Tsai et al. | |
| 2020/0145079 A1 | 5/2020 | Marinier et al. | |
| 2020/0329503 A1 | 10/2020 | Da Silva et al. | |
| 2020/0358574 A1 | 11/2020 | Jung et al. | |
| 2020/0367175 A1* | 11/2020 | Fukui | H04W 52/241 |
| 2020/0383060 A1 | 12/2020 | Park et al. | |
| 2021/0036818 A1* | 2/2021 | Eldessoki | H04L 5/0037 |
| 2021/0045066 A1 | 2/2021 | Akkarakaran et al. | |
| 2021/0045069 A1 | 2/2021 | Akkarakaran et al. | |
| 2021/0050889 A1 | 2/2021 | Park et al. | |
| 2021/0050890 A1 | 2/2021 | Park et al. | |
| 2021/0050891 A1 | 2/2021 | Park et al. | |
| 2021/0051653 A1 | 2/2021 | Park et al. | |
| 2021/0126749 A1* | 4/2021 | Iyer | H04B 7/0617 |
| 2021/0235304 A1* | 7/2021 | Akkarakaran | H04L 5/0057 |
| 2021/0337606 A1* | 10/2021 | Zhou | H04J 11/0069 |
| 2022/0132350 A1* | 4/2022 | Zhou | H04W 24/08 |
| 2022/0201695 A1* | 6/2022 | Landis | H04W 72/046 |
| 2023/0141785 A1* | 5/2023 | Manolakos | H04L 43/065 455/67.16 |
| 2023/0179381 A1* | 6/2023 | Rahman | H04B 7/0417 370/330 |

OTHER PUBLICATIONS

3GPP TS 38. 213 V2.0.0 (Dec. 2017); 3rd Generation Partnership Project; Technical Specification Group Radio Access Network; NR; Physical layer procedures for control (Release 15), pp. 1-56.

Extended European Search Report for European Application No. 18904615.4, dated Nov. 16, 2020.

NTT Docomo, "Power control framework for PUSCH", 3GPP TSG RAN WG1 Meeting #90, R1-1713973, Prague, Czech Republic, Aug. 21-25, 2017, 3 pages.

Office Action dated Jan. 17, 2022 in corresponding European Application No. 18904615.4.

Office Action dated Nov. 12, 2021 in corresponding Indian Application No. 202047032362.

Office Action dated Jun. 29, 2021 in corresponding European Patent Application No. 18904615.4.

Samsung: "Discussion on beam grouping", 3GPP Draft; R1-1612517, 3rd Generation Partnership Project, vol. RAN WG1, Nov. 4, 2016.

Samsung: "Discussion on Tx beam grouping configuration for multi-panel TRP and multi-TRP", 3GPP Draft; R1-1717610, 3rd Generation Partnership Project, vol. RAN WG1, Oct. 8, 2017.

Extended European Search Report dated Oct. 4, 2022 in corresponding European Patent Application No. 22175777.6.

Office Action dated Feb. 27, 2023 issued in corresponding Chinese Patent Application No. 201880088191.8 with an English machine translation.

* cited by examiner

| TRP GROUP ID | BASE STATION RECEPTION BEAM | GOOD TERMINAL TRANSMISSION BEAM |
|---|---|---|
| #1 | 101 | N/A |
| #1 | 102 | 202 |
| #1 | 103 | 201 |
| #1 | 104 | N/A |
| #2 | 105 | N/A |
| #2 | 106 | 205 |
| #2 | 107 | 206 |
| #2 | 108 | N/A |

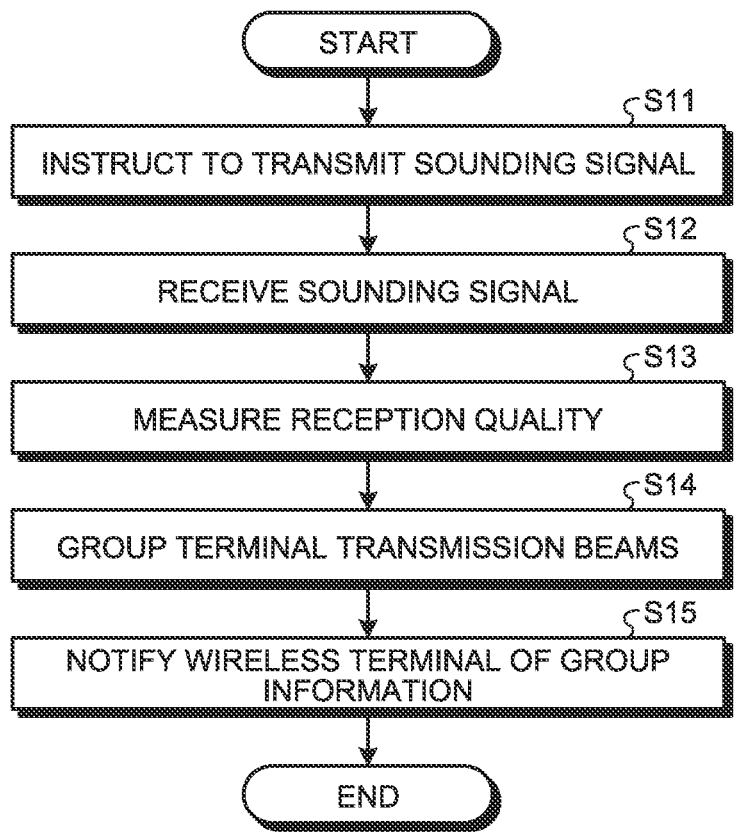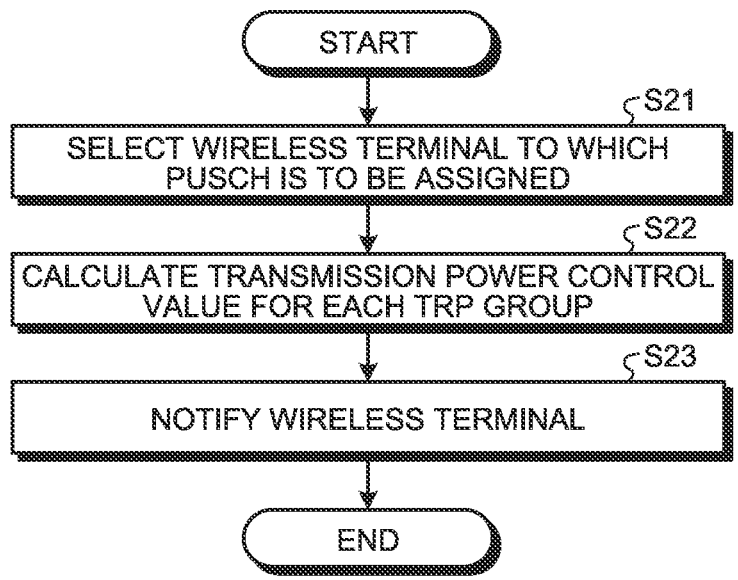

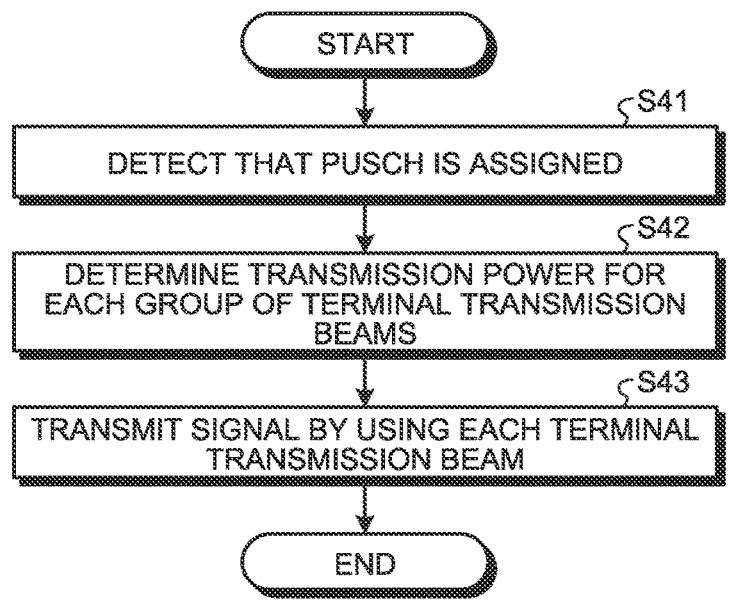
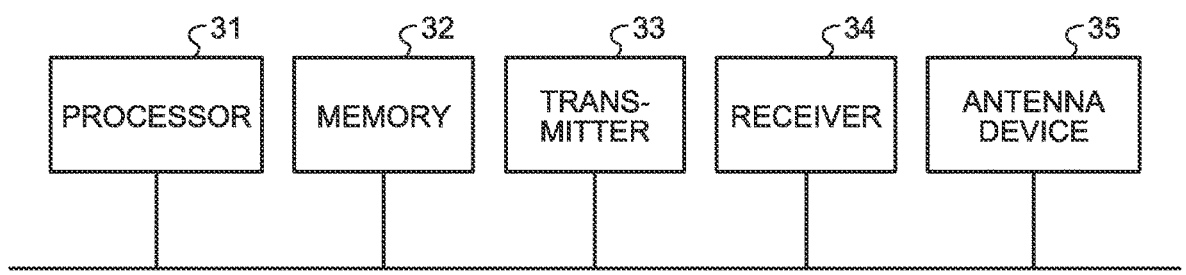

| TRP GROUP ID | BASE STATION TRANSMISSION BEAM |
|---|---|
| #1 | 111 |
| | 112 |
| | 113 |
| | 114 |
| #2 | 115 |
| | 116 |
| | 117 |
| | 118 |

FIG.15

| BASE STATION TRANSMISSION BEAM | TERMINAL RECEPTION BEAM |
|---|---|
| 111 | 213 |
| 112 | 212 |
| 113 | 211 |
| 114 | N/A |
| 115 | 214 |
| 116 | 215 |
| 117 | 216 |
| 118 | N/A |

RADIO BASE STATION, WIRELESS TERMINAL, RADIO COMMUNICATION SYSTEM, TRANSMISSION POWER CONTROLLING METHOD, CONTROL CIRCUIT AND PROGRAM STORAGE MEDIUM

CROSS-REFERENCE TO RELATED APPLICATION

This application is a Divisional of copending application Ser. No. 16/944,719, filed on Jul. 31, 2020, which is a Continuation of International Application No. PCT/JP2018/004435, filed on Feb. 8, 2018, all of which are hereby expressly incorporated by reference into the present application.

BACKGROUND OF THE INVENTION

1. Field of the Invention

The present invention relates to a radio base station, a wireless terminal, a radio communication system, and a transmission power controlling method for controlling transmission power of the wireless terminal.

2. Description of the Related Art

A wireless terminal that communicates with a radio base station typically controls transmission power of a signal transmitted therefrom to the radio base station. This is to allow a signal transmitted by the wireless terminal to be received by the radio base station without any error, and to prevent unnecessary interference with other radio base stations.

The New Radio (NR) standard defined in the 3rd Generation Partnership Project (3GPP) specifies two control methods, which are open-loop power control and closed-loop power control, as transmission power control methods for wireless terminals, for application to the 5th Generation Mobile Communications Systems (Non Patent Literature 1).

The open-loop power control is a control method performed when a wireless terminal starts communicating with a radio base station, or when a wireless terminal connects with another radio base station by handover and starts communicating with the radio base station. In the open-loop power control, the radio base station notifies the wireless terminal of, a target reception power value of a preamble to be transmitted by the wireless terminal using a physical random access channel (PRACH) when starting communication as notification information. The wireless terminal calculates a path loss of downlink transmission (in the direction from the radio base station to the wireless terminal) from a reception power value of a signal transmitted periodically from the radio base station and a transmission power value of the radio base station of which the wireless terminal is separately notified by the radio base station. Then, the wireless terminal determines transmission power of an uplink signal by adding a power value corresponding to the calculated path loss to the target reception power value of the preamble, of which the wireless terminal is notified by the radio base station.

In contrast, the closed-loop power control is a control method for controlling transmission power of a wireless terminal by transmitting a transmission power control (TPC) command explicitly identifying an increase or decrease in the transmission power by a radio base station to the wireless terminal after communication is started. While communicating with the radio base station, the wireless terminal once determines the transmission power value by the open-loop power control, adjusts the transmission power in accordance with the closed-loop power control from the radio base station, and determines a final transmission power value (See, for example, Non Patent Literature 1: 3GPP TS 38.213 V15.0.0 (2017-12)).

According to the NR standard, a configuration in which one radio base station transmits signals from a plurality of antennas installed at different locations, that is, a configuration in which one radio base station includes a plurality of transmission reception points (TRPs) can be considered. A TRP is a location at which the radio base station actually transmits and receives signals, that is a location at which an antenna is installed. In a case where a wireless terminal transmits signals by setting the same transmission power for all transmission beams, the reception powers of the signals from the wireless terminal may be different among TRPs of a radio base station that includes a plurality of TRPs. In addition, interference powers from other wireless terminals may also be different among the TRPs of the radio base station. Moreover, the signal to interference plus noise power ratios (SINRs) of the signals from the wireless terminal may be different among the TRPs, and some TRPs may satisfy proper SINR values while other TRPs may not.

With the technology described in Non Patent Literature 1, however, different transmission power control commands cannot be used for each of the TRPs. Thus, in a case where the SINRs of signals from a wireless terminal are different among different TRPs and some TRPs satisfy proper SINR values while the other TRPs do not, the transmission powers of the transmission beams from the wireless terminal toward the TRPs can only be performed such that the transmission powers are increased or decreased for all the TRPs according to the technology described in Non Patent Literature 1. There is thus a problem in that control for making the individual SINRs at the TRPs included in the radio base station closer to proper SINR values, cannot be performed.

The present invention has been made in view of the above, and an object thereof is to provide a radio base station capable of controlling transmission powers of signals transmitted by a wireless terminal in units of locations at which the signals are received in a case where signals from a wireless terminal can be received at a plurality of locations.

SUMMARY OF THE INVENTION

A radio base station according to the present invention includes: a plurality of base station antenna sections, each of which generates base station reception beams, and receives, by using the base station reception beams, one or more signals transmitted from a wireless terminal using one or more terminal transmission beams. The radio base station also includes a measurement unit that measures reception quality of each of the signals for each of the base station reception beams. The radio base station also includes a control unit that groups the base station reception beams into groups in units of the base station antenna sections, and performs transmission power control on the terminal transmission beams of the wireless terminal in units of the groups on the basis of a result of measurement of the measurement unit in units of the groups.

BRIEF DESCRIPTION OF THE DRAWINGS

FIG. 7 is a flowchart illustrating an operation of grouping terminal transmission beams of the wireless terminal at the radio base station according to the first embodiment.

FIG. 8 is a flowchart illustrating an operation when a wireless terminal to which a physical uplink shared channel (PUSCH) is to be assigned is selected in the radio base station according to the first embodiment.

FIG. 11 is a flowchart illustrating an operation of the wireless terminal according to the first embodiment when a PUSCH is assigned to the wireless terminal by the radio base station.

FIG. 12 is a diagram illustrating a hardware configuration for implementing the radio base station and the wireless terminal according to the first embodiment.

FIG. 15 is a table illustrating the association between base station transmission beams selected from a result of measurement of reception quality for each of terminal reception beams and the terminal reception beams in the wireless terminal according to the second embodiment.

DETAILED DESCRIPTION OF THE PREFERRED EMBODIMENTS

A radio base station, a wireless terminal, a radio communication system, and a transmission power controlling method according to certain embodiments of the present invention will be described in detail below with reference to the drawings. Note that the present invention is not limited to the embodiments.

First Embodiment

In the present embodiment, assume a radio communication system, in which the wireless terminal generates a transmission beam and the radio base station generates a reception beam to perform radio communication therebetween when a radio base station receives a signal transmitted from a wireless terminal. While a case where the radio base station includes two TRPs will be described in the present embodiment, the number of TRPs of the radio base station is not limited to two. Hereinafter, one or more beams associated with one TRP will be referred to as a TRP group. Specifically, a reception beam generated by one TRP in the radio base station belongs to one TRP group, and one or more transmission beams generated to be directed toward one TRP by the wireless terminal also belongs to one TRP group. The radio base station applies a transmission power control command in units of TRP groups, that is, controls transmission power of transmission beams of the wireless terminal in units of TRP groups. In the description below, a transmission beam generated by the wireless terminal will be referred to as a terminal transmission beam, and a reception beam generated by the radio base station will be referred to as a base station reception beam.

Figure 1:
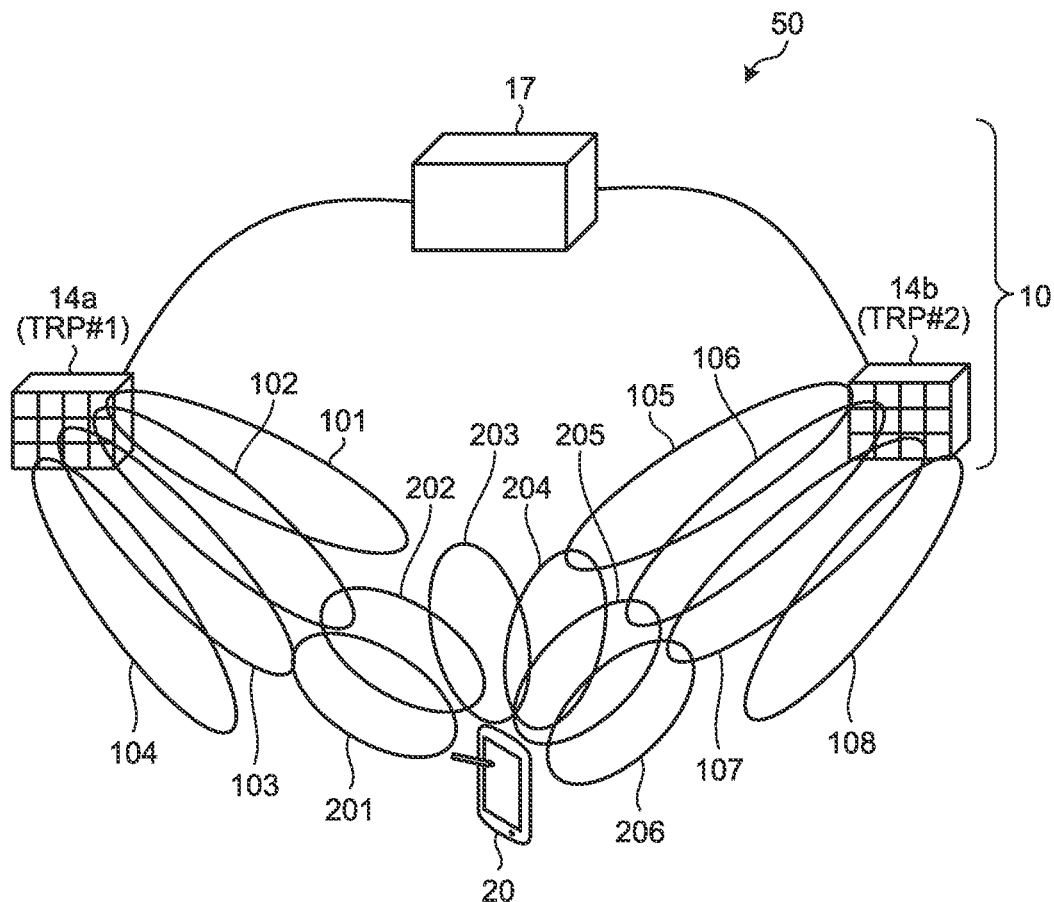
FIG. 1 is a diagram illustrating an example of a configuration of a radio communication system according to a first embodiment.

First, a method for determining association between a plurality of terminal transmission beams generated by the wireless terminal and a TRP will be explained. FIG. 1 is a diagram illustrating an example of a configuration of a radio communication system 50 according to the first embodiment of the present invention. The radio communication system 50 includes a radio base station 10, and a wireless terminal 20. The radio base station 10 includes a signal processing unit 17, and antenna sections 14a and 14b. Hereinafter, the locations at which the antenna sections 14a and 14b are installed will be referred to as TRP #1 and TRP #2, respectively. The radio base station 10 performs radio communication with the wireless terminal 20 by using the antenna sections 14a and 14b. The antenna sections 14a and 14b each generate four base station reception beams, and receive signals transmitted from the wireless terminal 20 by using the base station reception beams.

In the example of FIG. 1, the base station reception beams generated by the antenna section 14a will be referred to as base station reception beams 101 to 104, and the base station reception beams generated by the antenna section 14b will be referred to as base station reception beams 105 to 108.

The wireless terminal 20 generates six terminal transmission beams 201 to 206, and transmits signals to the radio base station 10 by using the terminal transmission beams 201 to 206. While the number of wireless terminals 20 in the radio communication system 50 is one in FIG. 1, this is one example, and the number of wireless terminals 20 may be two or more.

In the radio communication system 50 illustrated in FIG. 1, the wireless terminal 20 first transmits sounding signals by using the terminal transmission beams 201 to 206 that are all the beams which can be generated. A sounding signal is a measurement signal used for measuring the reception quality of a signal received by the radio base station 10. The sounding signals are used for associating a plurality of terminal transmission beams with a TRP. The radio base station 10 receives the sounding signals by using the base station reception beams 101 to 108, and measures the reception quality of each sounding signal for each base station reception beam. Note that, in a case where the wireless terminal 20 cannot generate all of the terminal transmission beams 201 to 206 at the same time, the wireless terminal 20 may generate the terminal transmission beams at different timings. In other words, the wireless terminal 20 may generate the terminal transmission beams 201 to 206 separately at multiple timings. In a similar manner, in a case where the radio base station 10 cannot generate all of the base station reception beams 101 to 108 at the same time, the radio base station 10 may generate the base station reception beams at different timings. In other words, the radio base station 10 may generate the base station reception beams 101 to 108 separately at multiple timings. In the present embodiment, an example in which the wireless terminal 20 is capable of generating all of the terminal transmission beams 201 to 206 at the same time, and the radio base station 10 is capable of generating all of the base station reception beams 101 to 108 at the same time will be described.

The radio base station 10 selects a terminal transmission beam from the wireless terminal 20 with which base station reception beams can achieve good reception quality on the basis of the results of measurement of the reception quality of the sounding signals. Good reception quality indicates a level in which the result of measurement of the reception quality, such as the SINR, is equal to or higher than a preset threshold. Note that, in order to select a terminal transmission beam with which good reception quality can be achieved, the radio base station 10 needs to distinguish a plurality of terminal transmission beams from the wireless terminal 20 from each other. Examples of methods for distinguishing a plurality of terminal transmission beams from the wireless terminal 20 at the radio base station 10 include a method of associating, by the wireless terminal 20, a sequence pattern on a sounding signal to be transmitted by each terminal transmission beam with a terminal transmission beam identifier (ID). The examples also include a method of associating, by the wireless terminal 20, the time at which a sounding signal to be transmitted by each terminal transmission beam with a terminal transmission beam ID. The examples also include a method of associating, by the wireless terminal 20, a frequency domain in which a sounding signal to be transmitted by each terminal transmission beam is placed with a terminal transmission beam ID. A terminal transmission beam ID is identification information for identifying each terminal transmission beam, that is, information capable of identifying each of the terminal transmission beams 201 to 206 in the example of FIG. 1. Note that, a method for generating a sequence to be put on a sounding signal is described in 6.4.1.4.2 of 3GPP specification TS 38.211 V15.0.0.

Figure 2:
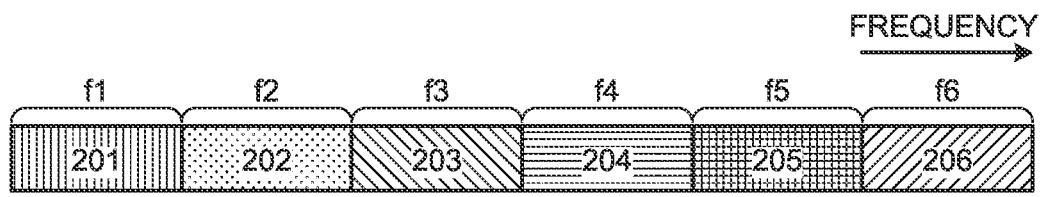
FIG. 2 is a diagram illustrating an example of frequency mapping of a sounding signal transmitted by a wireless terminal according to the first embodiment.

FIG. 2 is a diagram illustrating an example of frequency mapping of a sounding signal transmitted by the wireless terminal 20 according to the first embodiment. Information on the frequency mapping illustrated in FIG. 2 shows association between frequency domains f1 to f6 in each of which a sounding signal transmitted by the wireless terminal 20 is placed and terminal transmission beam IDs. In FIG. 2, the terminal transmission beam IDs are represented by 201 to 206. The wireless terminal 20 transmits a sounding signal by each terminal transmission beam by using only the frequency domain assigned to the terminal transmission beam. For example, the wireless terminal 20 transmits a sounding signal by the terminal transmission beam 201 within the frequency domain f1. The radio base station 10 is capable of determining terminal transmission beams from the wireless terminal 20 with which base station reception beams can achieve good reception quality by specifying information on frequency mapping illustrated in FIG. 2 to the wireless terminal 20 in advance.

Figures 3, 4:
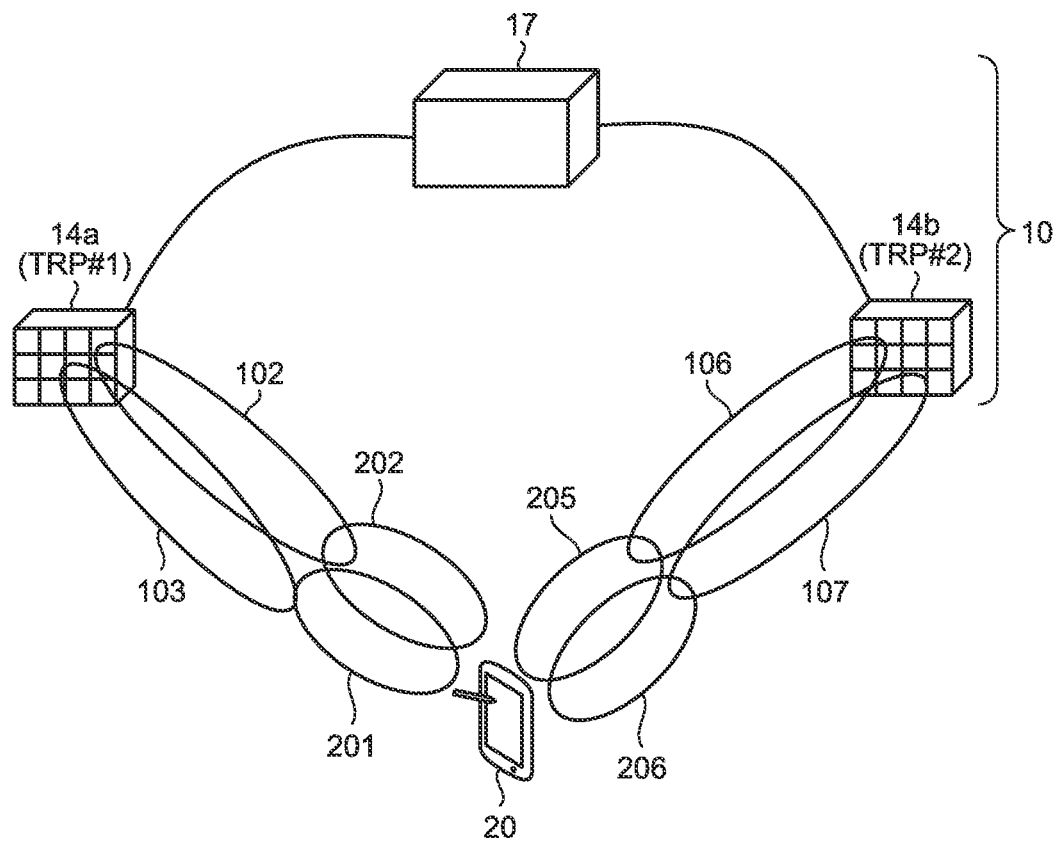
FIG. 3 is a table illustrating an example of selecting, for each base station reception beam, a terminal transmission beam from the wireless terminal achieving good reception quality at the radio base station according to the first embodiment.
FIG. 4 is a diagram illustrating an example of a state in which the radio base station according to the first embodiment causes the wireless terminal to transmit signals such as data by using specified terminal transmission beams.

FIG. 3 is a table illustrating an example of a result of selecting, for each base station reception beam, a terminal transmission beam from the wireless terminal 20 achieving good reception quality at the radio base station 10 according to the first embodiment. As illustrated in FIG. 3, at the radio base station 10, regarding the base station reception beam 102, the sounding signal transmitted from the wireless terminal 20 by the terminal transmission beam 202 has good reception quality. In addition, at the radio base station 10, regarding the base station reception beam 103, the sounding signal transmitted from the wireless terminal 20 by the terminal transmission beam 201 has good reception quality. In addition, at the radio base station 10, regarding the base station reception beam 106, the sounding signal transmitted from the wireless terminal 20 by the terminal transmission beam 205 has good reception quality. In addition, at the radio base station 10, regarding the base station reception beam 107, the sounding signal transmitted from the wireless terminal 20 by the terminal transmission beam 206 has good reception quality. FIG. 3 also illustrates that, at the radio base station 10, good reception quality of the sounding signal transmitted from the wireless terminal 20 is not achieved regarding the base station reception beams 101, 104, 105, and 108.

FIG. 3 further illustrates the association between each base station reception beam at the radio base station 10 and a TRP group ID. A TRP group ID is information identifying each TRP group. In the example illustrated in FIG. 3, the TRP group ID of the TRP group associated with the TRP #1 is represented by #1, and the TRP group ID of the TRP group associated with the TRP #2 is represented by #2. In the example illustrated in FIG. 3, the base station reception beams 101 to 104 belong to TRP group ID #1, and the base station reception beams 105 to 108 belong to TRP group ID #2.

The radio base station 10 notifies the wireless terminal 20 of the association between the terminal transmission beams from the wireless terminal 20 achieving good reception quality and the TRP group IDs as illustrated in FIG. 3. For a method for the notification from the radio base station 10 to the wireless terminal 20, layer 1 signaling using a physical downlink control channel (PDCCH) defined in the NR standard, MAC signaling by a medium access control (MAC) layer, or the like is used. A specific example of the notification information contains: TRP group ID #1={terminal transmission beam 201, terminal transmission beam 202}; and TRP group ID #2={terminal transmission beam 205, terminal transmission beam 206}. This means that the radio base station 10 grouped the terminal transmission beams 201 and 202 into the TRP group ID #1, and the terminal transmission beams 205 and 206 into the TRP group ID #2. The groups represented by the TRP group IDs #1 and #2 are groups into which a plurality of terminal transmission beams from the wireless terminal 20 are grouped in units of TRPs #1 and #2, of the radio base station 10 at which signals transmitted by the terminal transmission beams are received.

Next, a method by which the radio base station 10 controls the transmission power of the wireless terminal 20 by using a transmission power control command will be explained. FIG. 4 is a diagram illustrating an example of a state in which the radio base station 10 according to the first embodiment causes the wireless terminal 20 to transmit signals such as data by using the specified terminal transmission beams 201, 202, 205, and 206. The radio base station 10 specifies the terminal transmission beams of the wireless terminal 20 by using UL grant defined in the NR standard. Format 0_1 of downlink control information (DCI) defined in 3GPP specification TS 38.212 V15.0.0 is used for transmission of a message permitting the wireless terminal 20 to perform PUSCH transmission, that is, the aforementioned UL grant. An "SRS resource indicator" is defined in a message of Format 0_1, which specifies a beam of a sounding signal (sounding reference signal: SRS) or a beam of a PUSCH signal using the same beam as the sounding signal. In addition, "TPC command for scheduled PUSCH" is defined in the message of Format 0_1, which is a transmission power control command. Note that, in the present embodiment, elements of the transmission power control command are extended to correspond to the number of TRP groups. Specifically, when the number of TRP groups is n, the transmission power control command is defined as "TPC command for scheduled PUSCH #1", "TPC command for scheduled PUSCH #2", . . . , "TPC command for scheduled PUSCH #n". In the present embodiment, the extended format will be referred to as Format 0_1E.

Figure 5:
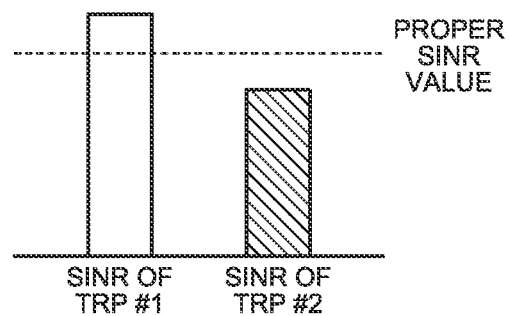
FIG. 5 is a diagram illustrating an example of a result of measurement of reception quality at each TRP of the radio base station according to the first embodiment.

A case where the extended format of Format 0_1E is applied to the example of FIG. 4 will be explained. FIG. 5 is a diagram illustrating an example of a result of measurement of reception quality at each TRP of the radio base station 10 according to the first embodiment. As described above, assume that the reception quality indicates an SINR. In the example of FIG. 5, the SINR satisfies a proper SINR value at the TRP #1 while the SINR does not satisfy the proper SINR value at the TRP #2. In such a case, the radio base station 10 notifies the wireless terminal 20 of a message containing content of the transmission power control command. The content included in the message is: "TPC command for scheduled PUSCH #1=−1 [dB]", "TPC command for scheduled PUSCH #2=+1 [dB]", and "SRS resource indicator={201,202,205,206}".

Upon receiving the message including the aforementioned content, the wireless terminal 20 controls the transmission powers of the terminal transmission beams in accordance with the content in the message. As described above, the wireless terminal 20 has separately received the information of TRP group ID #1={terminal transmission beam 201, terminal transmission beam 202} and TRP group ID #2={terminal transmission beam 205, terminal transmission beam 206}. The wireless terminal 20 uses the obtained information, and accumulates the transmission power by −1 [dB] from the value at the previous transmission for the TRP group ID #1 that is, the group of the terminal transmission beams 201 and 202 and accumulates the transmission power by +1 [dB] from the value at the previous transmission for the TRP group ID #2, that is, the group of the terminal transmission beams 205 and 206.

Regarding the SINRs at the TRPs illustrated in FIG. 5, the radio base station 10 is capable of lowering the SINR at the TRP #1 and increasing the SINR at the TRP #2 by lowering the transmission power of the terminal transmission beams 201 and 202 of the wireless terminal 20 and increasing the transmission power of the terminal transmission beams 205 and 206 of the wireless terminal 20. In this manner, the radio base station 10 is capable of making the SINR closer to the proper SINR value in units of TRPs by controlling the transmission power of signals transmitted by the wireless terminal 20 in units of TRPs, or more specifically, the transmission power of the terminal transmission beams.

Figure 6:
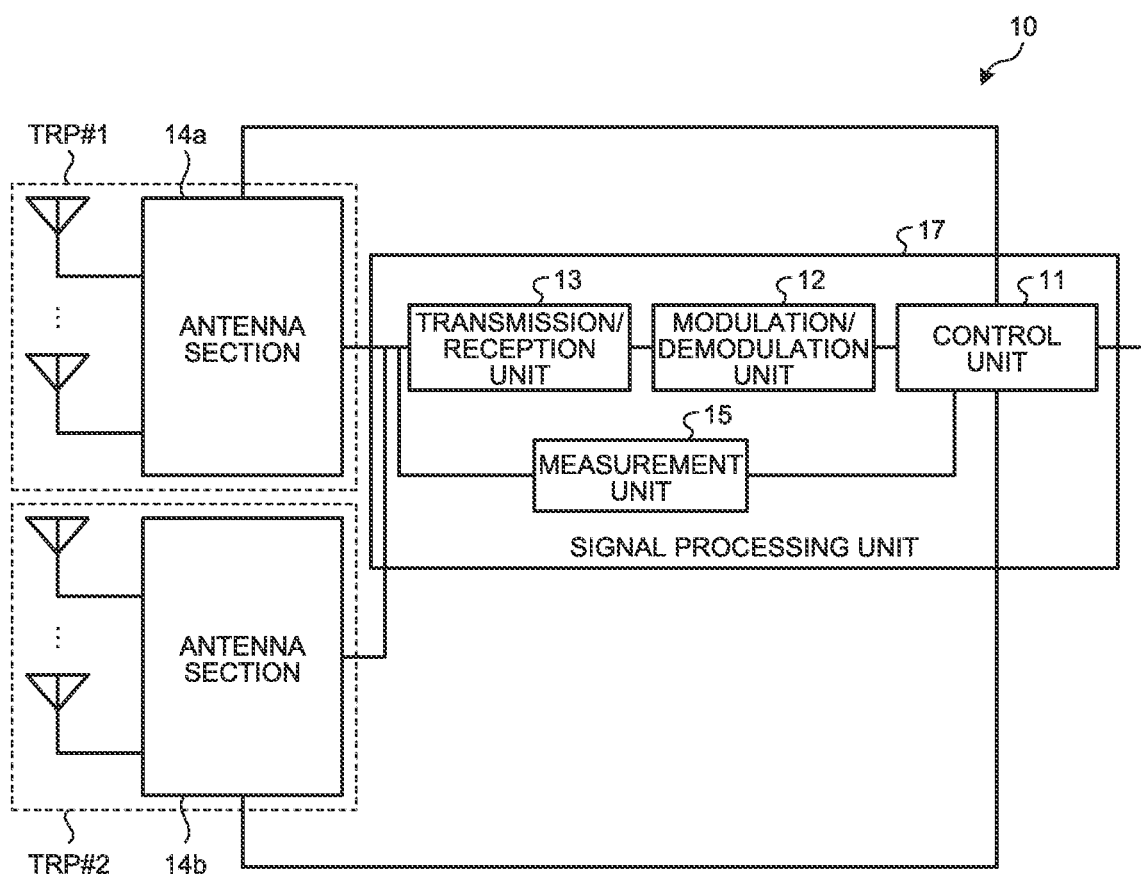
FIG. 6 is a diagram illustrating an example of a configuration of the radio base station according to the first embodiment.

Next, a configuration of the radio base station 10 will be described. FIG. 6 is a diagram illustrating an example of a configuration of the radio base station 10 according to the first embodiment. The radio base station 10 includes a signal processing unit 17, and antenna sections 14a and 14b. The signal processing unit 17 includes a control unit 11, a modulation/demodulation unit 12, a transmission/reception unit 13, and a measurement unit 15.

The control unit 11 instructs the wireless terminal 20 to transmit a sounding signal, and associates the TRP group IDs, the base station reception beams, and the terminal transmission beams with each other, that is, groups the TRP group IDs, the base station reception beams, and the terminal transmission beams as illustrated in FIG. 3 on the basis of the reception quality of each sounding signal. In addition, the control unit 11 selects a wireless terminal 20 to which a PUSCH is to be assigned, selects a terminal transmission beam of the wireless terminal 20 with which good reception quality is achieved at each base station reception beam, calculates a transmission power control value to be instructed using a transmission power control command, controls the directions of the base station reception beams, transmits and receives data to and from a core network, which is not illustrated, and the like.

The modulation/demodulation unit 12 modulates a signal, such as data and control information, acquired from the control unit 11, and outputs the modulated signal to the transmission/reception unit 13. The modulation/demodulation unit 12 also demodulates a signal acquired from the transmission/reception unit 13, and outputs the demodulated signal to the control unit 11.

The transmission/reception unit 13 converts a signal acquired from the modulation/demodulation unit 12 from a digital signal into an analog signal, and up-converts the frequency thereof. The transmission/reception unit 13 outputs the analog signal obtained by the up-conversion to each of the antenna sections 14a and 14b. The transmission/reception unit 13 also down-converts the frequencies of signals acquired from the antenna sections 14a and 14b, and converts the signals from analog signals into digital signals. The transmission/reception unit 13 outputs the digital signals obtained by the conversion to the modulation/demodulation unit 12.

The antenna sections 14a and 14b are base station antenna sections that each generate a plurality of base station reception beams, and receive, by using the base station reception beams, signals transmitted from the wireless terminal 20 using a plurality of terminal transmission beams.

Specifically, the antenna sections 14a and 14b each transmit signals acquired from the transmission/reception unit 13 in corresponding beam directions as instructed by the control unit 11. The antenna sections 14a and 14b also receive signals from the wireless terminal 20 in beam directions as instructed by the control unit 11. The antenna sections 14a and 14b each generate a plurality of base station reception beams at the same time. The measurement unit 15 measures the reception quality, the reception power, or the like of signals acquired from the antenna sections 14a and 14b. Specifically, the measurement unit 15 measures the reception quality, the reception power, or the like of a signal for each of the base station reception beams generated by the antenna sections 14a and 14b. The measurement unit 15 outputs results of measurements such as the reception quality, the reception power, or the like to the control unit 11. The signals whose reception quality, reception power, or the like is measured by the measurement unit 15 include the aforementioned sounding signal.

Operation of the radio base station 10 will be explained. FIG. 7 is a flowchart illustrating an operation of grouping the terminal transmission beams of the wireless terminal 20, at the radio base station 10 according to the first embodiment. For causing the wireless terminal 20 to transmit a sounding signal and causing the measurement unit 15 to measure the reception quality of the sounding signal for each of the base station reception beams 101 to 108 at the antenna sections 14a and 14b, the control unit 11 generates frequency mapping as illustrated in FIG. 2. The control unit 11 generates control information containing information on the frequency mapping and instructing to transmit a sounding signal, and transmits the control information to the wireless terminal 20 via the modulation/demodulation unit 12, the transmission/reception unit 13, and the antenna section 14a. In this manner, the control unit 11 instructs the wireless terminal 20 to transmit a sounding signal (step S11). Upon receiving the control information from the radio base station 10, the wireless terminal 20 transmits a sounding signal in accordance with the control information.

For measurement of the reception quality of the sounding signal, the control unit 11 indicates the directions of the base station reception beams to each of the antenna sections 14a and 14b and causes the antenna sections 14a and 14b to receive the sounding signal from the wireless terminal 20 (step S12). The measurement unit 15 receives the received signals from the antenna sections 14a and 14b, and measures the reception quality, that is specifically, the SINR for each of the received signals as described above (step S13). The measurement unit 15 notifies the control unit 11 of the result of measurements of the reception quality. The control unit 11 groups the terminal transmission beams of the wireless terminal 20 on the basis of the result of measurements from the measurement unit 15 (step S14). Specifically, the control unit 11 generates a map indicating the relation of the TRP group IDs, the base station reception beams, and terminal transmission beams that achieve good reception quality as illustrated in FIG. 3. The control unit 11 associates a TRP group ID with each terminal transmission beam that achieves good reception quality from the generated map, and groups the terminal transmission beams of the wireless terminal 20 in units of TRPs of the radio base station 10. Specifically, the control unit 11 selects, for each base station reception beam that has achieved preset reception quality, a terminal transmission beam from the wireless terminal 20 used for transmission of the sounding signal received using the base station reception beam. The control unit 11 groups a plurality of terminal transmission beams of the wireless terminal 20 into groups in units of base station antenna sections in such a manner that terminal transmission beams selected for base station reception beams generated by one base station antenna section are grouped into the same group. The control unit 11 generates control information containing group information on the grouping of the terminal transmission beams of the wireless terminal 20, and transmits the control information to the wireless terminal 20 via the modulation/demodulation unit 12, the transmission/reception unit 13, and the antenna section 14a. In this manner, the control unit 11 notifies the wireless terminal 20 of the group information of the terminal transmission beams of the wireless terminal 20 (step S15). Note that, for transmitting the control information to the wireless terminal 20, that is, for notifying the wireless terminal 20 of the group information, the radio base station 10 can transmit the control information by using base station transmission beams generated by one TRP that is monitored as a main TRP by the wireless terminal 20, for example.

FIG. 8 is a flowchart illustrating an operation when a wireless terminal 20 to which a PUSCH is to be assigned is selected in the radio base station 10 according to the first embodiment. Upon selecting a wireless terminal 20 to which a PUSCH is to be assigned (step S21), the control unit 11 calculates a transmission power control value for each TRP group (step S22). The control unit 11 compares the SINRs of base station reception beams at each TRP measured by the measurement unit 15 when the PUSCH has previously been received from the same wireless terminal 20 with the proper SINR value, for example. The control unit 11 calculates a transmission power control value for each TRP group on the basis of the result of comparison. The control unit 11 notifies the wireless terminal 20 of the transmission power control value for the terminal transmission beams of the wireless terminal 20 for each TRP group (step S23). Specifically, the control unit 11 generates DCI Format 0_1E in which the transmission power control value for TRP group is a TPC command for scheduled PUSCH #1 to #2, and transmits the DCI Format 0_1E to the wireless terminal 20 via the modulation/demodulation unit 12, the transmission/reception unit 13, and the antenna section 14a.

Figure 9:
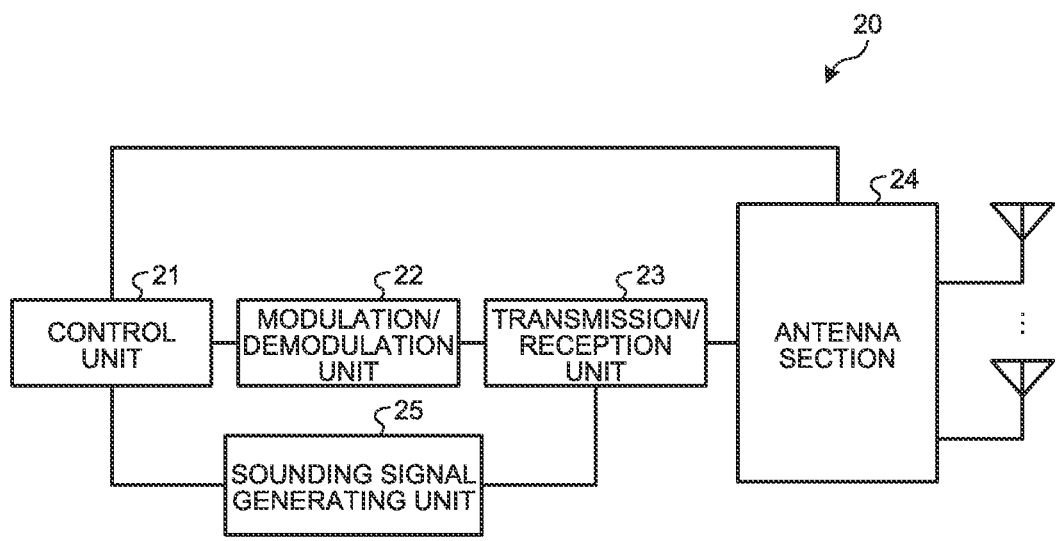
FIG. 9 is a diagram illustrating an example of a configuration of the wireless terminal according to the first embodiment.

Next, a configuration of the wireless terminal 20 will be described. FIG. 9 is a diagram illustrating an example of a configuration of the wireless terminal 20 according to the first embodiment. The wireless terminal 20 includes a control unit 21, a modulation/demodulation unit 22, a transmission/reception unit 23, an antenna section 24, and a sounding signal generating unit 25.

The control unit 21 analyzes the control information of which the wireless terminal 20 is notified from the radio base station 10, and instructs transmission of a sounding signal, instructs transmission of a PUSCH, controls the transmission power for each group of terminal transmission beams, controls the directions of the terminal transmission beams, and the like.

The modulation/demodulation unit 22 modulates a signal, such as data and control information, acquired from the control unit 21, and outputs the modulated signal to the transmission/reception unit 23. The modulation/demodulation unit 22 also demodulates a signal acquired from the transmission/reception unit 23, and outputs the demodulated signal to the control unit 21.

The transmission/reception unit 23 converts a signal acquired from the modulation/demodulation unit 22 from a digital signal into an analog signal, and up-converts the frequency thereof. The transmission/reception unit 23 outputs the analog signal obtained by the up-conversion to the antenna section 24. The transmission/reception unit 23 also down-converts the frequency of a signal acquired from the antenna section 24, and converts the signal from an analog signal into a digital signal. The transmission/reception unit 23 outputs the digital signal obtained by the conversion to the modulation/demodulation unit 22.

The antenna section 24 is a terminal antenna section that generates a plurality of terminal transmission beams, and transmits signals to the radio base station 10 by using the plurality of terminal transmission beams. The antenna section 24 transmits a signal acquired from the transmission/reception unit 23 in a beam direction as instructed by the control unit 21. The antenna section 24 also receives a signal from the radio base station 10 in a beam direction as instructed by the control unit 21. The antenna section 24 generates a plurality of terminal transmission beams at the same time.

The sounding signal generating unit 25 is a measurement signal generating unit that generates a sounding signal on the basis of an instruction from the control unit 21.

Figure 10:
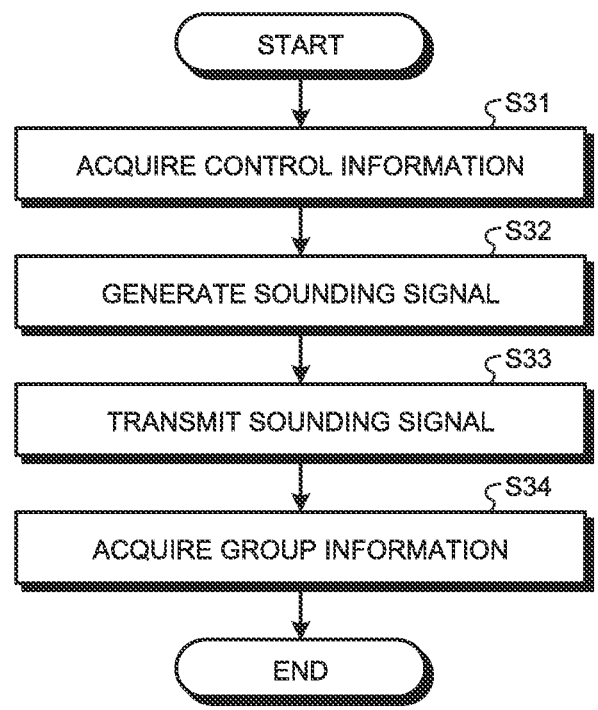
FIG. 10 is a flowchart illustrating an operation until the wireless terminal according to the first embodiment acquires group information of terminal transmission beams of the wireless terminal from the radio base station.

Operation of the wireless terminal 20 will be explained. FIG. 10 is a flowchart illustrating an operation until the wireless terminal 20 according to the first embodiment acquires the group information of the terminal transmission beams of the wireless terminal 20 from the radio base station 10. Upon acquiring control information instructing to transmit a sounding signal from the radio base station 10 via the antenna section 24, the transmission/reception unit 23, and the modulation/demodulation unit 22 (step S31), the control unit 21 instructs the sounding signal generating unit 25 to generate a sounding signal. In this process, the control unit 21 notifies the sounding signal generating unit 25 of information of frequency mapping contained in the control information. The sounding signal generating unit 25 generates a sounding signal for each terminal transmission beam on the basis of the information of frequency mapping (step S32). In addition, the control unit 21 determines the directions of the terminal transmission beams on the basis of the information of frequency mapping, and indicates the directions of the terminal transmission beams to the antenna section 24. The antenna section 24 generates terminal transmission beams on the basis of the instruction from the control unit 21, and transmits a sounding signal acquire from the sounding signal generating unit 25 via the transmission/reception unit 23, in each of the directions of the terminal transmission beam that are instructed by the control unit 21 (step S33). As described above, the radio base station 10 groups the terminal transmission beams of the wireless terminal 20 on the basis of the reception quality of each of the base station reception beams by which the sounding signal is received, and notifies the wireless terminal 20 of a control signal including the group information. The control unit 21 acquires the control information containing the group information from the radio base station 10 via the antenna section 24, the transmission/reception unit 23, and the modulation/demodulation unit 22. In this manner, the wireless terminal 20 is capable of acquiring the group information generated by the radio base station 10 (step S34).

FIG. 11 is a flowchart illustrating an operation of the wireless terminal 20 according to the first embodiment when a PUSCH is assigned to the wireless terminal 20 by the radio base station 10. Upon acquiring DCI Format 0_1E from the radio base station 10 via the antenna section 24, the transmission/reception unit 23, and the modulation/demodulation unit 22, the control unit 21 detects that a PUSCH is assigned to the wireless terminal 20 (step S41). The control unit 21 generates a signal to be transmitted to the radio base station 10, and outputs the signal to the modulation/demodulation unit 22. In addition, the control unit 21 accumulates the transmission power control values for each group of terminal transmission beams on the basis of "TPC command for scheduled PUSCH #1 to #2" and "SRS resource indicator" for each TRP group contained in the DCI Format 0_1E. Specifically, the control unit 21 accumulates the transmission power control values for each group of terminal transmission beams and determines the transmission power on the basis of the information of TRP group ID #1={terminal transmission beam 201, terminal transmission beam 202} and TRP group ID #2={terminal transmission beam 205, terminal transmission beam 206}, which are acquired group information (step S42), and notifies the antenna section 24 of the determined transmission power. The antenna section 24 transmits signals to the radio base station 10 by using the terminal transmission beams in accordance with the transmission power of which the antenna section 24 has been notified by the control unit 21 (step S43).

Next, a hardware configuration for implementing the radio base station 10 and the wireless terminal 20 will be described. FIG. 12 is a diagram illustrating an example of a hardware configuration for implementing the radio base station 10 and the wireless terminal 20 according to the first embodiment. The radio base station 10 is implemented by a processor 31, a memory 32, a transmitter 33, a receiver 34, and antenna device 35, for example.

The processor 31 is a central processing unit (CPU; also referred to as a central processing device, a processing device, a computing device, a microprocessor, a microcomputer, a processor or a digital signal processor (DSP)), a system large scale integration (LSI), or the like. The memory 32 is a nonvolatile or volatile semiconductor memory such as a random access memory (RAN), a read only memory (ROM), a flash memory, and an erasable programmable read only memory (EPROM), an electrically erasable programmable read only memory (EEPROM: registered trademark), a magnetic disk, a flexible disk, an optical disk, a compact disc, a mini disc, a digital versatile disc (DVD), or the like.

The control unit 11 and the modulation/demodulation unit 12 of the base station are implemented by the processor 31 and programs stored in the memory 32. Specifically, the control unit 11 and the modulation/demodulation unit 12 are implemented by the processor 31 by reading programs for performing operations of the units from the memory 32 and executing the programs. The transmission/reception unit 13 is implemented by the transmitter 33 and the receiver 34. Specifically, transmission processes of the transmission/reception unit 13 are performed by the transmitter 33, and reception processes of the transmission/reception unit 13 are performed by the receiver 34. The measurement unit 15 is also implemented by the receiver 34. The antenna sections 14a and 14b are each implemented by the antenna device 35.

The wireless terminal 20 has a similar configuration. The control unit 21, the modulation/demodulation unit 22, and the sounding signal generating unit 25 are implemented by the processor 31 and programs store in the memory 32. Specifically, the control unit 11 and the modulation/demodulation unit 12 are implemented by the processor 31 by reading programs for performing operations of the units from the memory 32 and executing the programs. The transmission/reception unit 23 is implemented by the transmitter 33 and the receiver 34. Specifically, transmission processes of the transmission/reception unit 23 are performed by the transmitter 33, and reception processes of the transmission/reception unit 23 are performed by the receiver 34. The antenna section 24 is implemented by the antenna device 35.

While Format 0_1E, which is an extension based on Format 0_1 defined in the NR standard, is defined for transmission of the transmission power control command for each TRP from the radio base station 10 to the wireless terminal 20 in the present embodiment, the format is not limited to Format 0_1E. Any other format may be used as long as a transmission power control command corresponding to TPC command for scheduled PUSCH #1 to #n for each TRP group can be defined.

As described above, according to the present embodiment, in the case where the radio base station 10 includes a plurality of TRPs that are installed at different locations from each other, the radio base station 10 performs transmission power control of the wireless terminal 20 on the basis of the signal reception quality, such as the SINR, at each TRP. Specifically, the radio base station 10 measures the reception quality of a sounding signal transmitted from the wireless terminal 20 for each base station reception beam at each TRP, groups a plurality of terminal transmission beams directed toward one TRP, among a plurality of terminal transmission beams generate by one wireless terminal 20, into one TRP group on the basis of the result of measurements, and performs transmission power control in units of TRP groups. Thus, in the case where signals from the wireless terminal 20 can be received at a plurality of TRPs, the radio base station 10 is capable of performing control to make the SINR at each of the TRPs close to the proper SINR value by controlling the transmission power of the signals transmitted by the wireless terminal 20 in units of TRPs at which the signals are to be received. In addition, because the radio base station 10 does not perform transmission power control in units of terminal transmission beams, transmission power control can be performed without unnecessarily increasing the number of transmission power control commands, which reduces the increase in the overhead of control during communication.

Second Embodiment

In the first embodiment, the radio base station 10 groups the terminal transmission beams of the wireless terminal 20. In a second embodiment, a case where the wireless terminal groups the terminal transmission beams will be described. In the second embodiment, assume that so-called beam correspondence, which means that base station transmission beams and base station reception beams form the same gain patterns as each other, is satisfied at each of the TRPs of the radio base station. The base station transmission beams are transmission beams generated at the respective TRPs of the radio base station of the second embodiment for transmission of signals to the wireless terminal.

In addition, assume that the so-called beam correspondence, which means that terminal transmission beams and terminal reception beams form the same gain patterns as each other, is satisfied in the wireless terminal as well. The terminal reception beams are reception beams generated in the wireless terminal of the second embodiment for reception of signals from the radio base station.

Figures 13, 14:
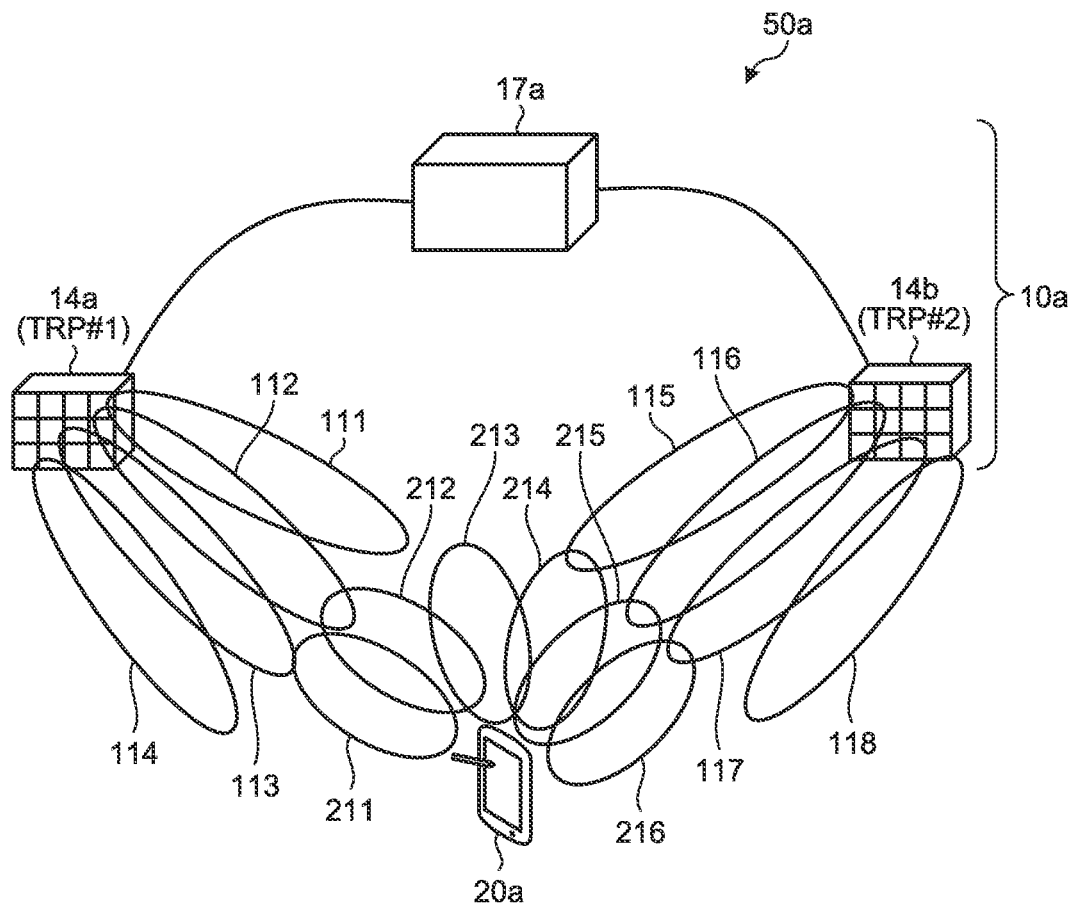
FIG. 13 is a diagram illustrating an example of a configuration of a radio communication system according to a second embodiment.
FIG. 14 is a table illustrating an example of information on the relation of TRP group IDs and base station transmission beams of which a radio base station notifies a wireless terminal in the second embodiment.

FIG. 13 is a diagram illustrating an example of a configuration of a radio communication system 50a according to the second embodiment. The radio communication system 50a includes a radio base station 10a, and a wireless terminal 20a. The radio base station 10a includes a signal processing unit 17a, and antenna sections 14a and 14b. The radio base station 10a performs radio communication with the wireless terminal 20a by using the antenna sections 14a and 14b. The antenna sections 14a and 14b generate base station reception beams 101 to 104 and base station reception beams 105 to 108, respectively, and receive signals transmitted from the wireless terminal 20a by using the base station reception beams 101 to 104 and the base station reception beams 105 to 108, respectively, in a manner similar to the first embodiment illustrated in FIG. 1. In addition, in the present embodiment, the antenna sections 14a and 14b generate base station transmission beams 111 to 114 and base station transmission beams 115 to 118, respectively, and transmit signals to the wireless terminal 20a by using the base station transmission beams 111 to 114 and the base station transmission beams 115 to 118, respectively, as illustrated in FIG. 13. The wireless terminal 20a generates six terminal transmission beams 201 to 206, and transmits signals to the radio base station 10a by using the terminal transmission beams 201 to 206, in a manner similar to the wireless terminal 20 illustrated in FIG. 1. In addition, in the present embodiment, the wireless terminal 20a generates terminal reception beams 211 to 216, and receives signals transmitted from the radio base station 10a by using the terminal reception beams 211 to 216 as illustrated in FIG. 13. While the number of wireless terminals 20a in the radio communication system 50a is one in FIG. 13, the number of wireless terminals 20a may be two or more.

Specifically, in the present embodiment, assume that base station reception beams 101 to 108 correspond to base station transmission beams 111 to 118, respectively, the base station reception beams 101 to 108 and the base station transmission beams 111 to 118 form the same gain patterns as each other, and thus beam correspondence is satisfied in the radio base station 10a. In addition, assume that terminal transmission beams 201 to 206 correspond to terminal reception beams 211 to 216, respectively, the terminal transmission beams 201 to 206 and the terminal reception beams 211 to 216 form the same gain patterns as each other, and thus beam correspondence is satisfied in the wireless terminal 20a.

When beam correspondence is satisfied, the radio base station 10a notifies the wireless terminal 20a of information as illustrated in FIG. 14. FIG. 14 is a table illustrating an example of information on the relation of TRP group IDs and base station transmission beams which is notified by the radio base station 10a to the wireless terminal 20a in the second embodiment. In this manner, the radio base station 10a notifies the wireless terminal 20a of the information on base station transmission beams to be used for transmission at each TRP. The radio base station 10a may notify all the wireless terminals 20a in common of the information illustrated in FIG. 14 as notification information, or may individually notify the wireless terminals 20a of the information.

A wireless terminal 20a that has acquired the information on the association between the TRP group IDs and the base station transmission beams, associates a base station transmission beam with a terminal reception beam. As illustrated in FIG. 13, the wireless terminal 20a measures the reception quality of each of the terminal reception beams 211 to 216 to select which of the terminal reception beams 211 to 216 to use to receive signals transmitted using the base station transmission beams 111 to 118 from the radio base station 10a. FIG. 15 is a table illustrating the association between the base station transmission beams 111 to 118 selected from the result of measurements of the reception quality for each of the terminal reception beams 211 to 216 and the terminal reception beams 211 to 216 of the wireless terminal 20a according to the second embodiment.

As illustrated in FIG. 15, the wireless terminal 20a achieves the best reception quality when receiving, by using the terminal reception beam 213, a signal transmitted from the radio base station 10a using the base station transmission beam 111. In addition, the wireless terminal 20a achieves the best reception quality when receiving, by using the terminal reception beam 212, a signal transmitted from the radio base station 10a using the base station transmission beam 112. In addition, the wireless terminal 20a achieves the best reception quality when receiving, by using the terminal reception beam 211, a signal transmitted from the radio base station 10a using the base station transmission beam 113. In addition, the wireless terminal 20a achieves the best reception quality when receiving, by using the terminal reception beam 214, a signal transmitted from the radio base station 10a using the base station transmission beam 115. In addition, the wireless terminal 20a achieves the best reception quality when receiving, by using the terminal reception beam 215, a signal transmitted from the radio base station 10a using the base station transmission beam 116. In addition, the wireless terminal 20a achieves the best reception quality when receiving, by using the terminal reception beam 216, a signal transmitted from the radio base station 10a using the base station transmission beam 117. FIG. 15 also illustrates that, at the wireless terminal 20a, there are no terminal reception beams that achieved good reception quality concerning signals transmitted from the radio base station 10a using the base station transmission beams 114 and 118.

A signal transmitted from the radio base station 10a and used for measurement of the reception quality at the wireless terminal 20a, is a synchronization signal (SS) or a channel state information-reference signal (CSI-RS) defined in the NR standard. Either of the signals is a signal that is periodically transmitted from the radio base station 10a. An SS is added with an index that identifies each base station transmission beam. A CSI-RS uses a different time-frequency resource for different base station transmission beam. Thus, in both cases of receiving either of an SS and a CSI-RS, the wireless terminal 20a is capable of distinguishing which base station transmission beam was used for transmission of the signal.

The wireless terminal 20a that has associated the base station transmission beams with the terminal reception beams is capable of associating a TRP group ID with a terminal transmission beam by using the information illustrated in FIGS. 14 and 15 because beam correspondence is satisfied in both of the radio base station 10a and the wireless terminal 20a. In this manner, the wireless terminal 20a is capable of generating groups of terminal transmission beams in units of TRPs of the radio base station 10a. Specifically, the wireless terminal 20a is capable of determining that terminal transmission beams 201, 202, and 203 associated with the terminal reception beams 211, 212, and 213 are grouped into the same group of TRP group #1, and that terminal transmission beams 204, 205, and 206 associated with terminal reception beams 214, 215, and 216 are grouped into the same group of TRP group #2. Note that the operations of the radio base station 10a and the wireless terminal 20a other than the grouping are similar to those of the radio base station 10 and the wireless terminal 20, respectively, in the first embodiment.

Figure 16:
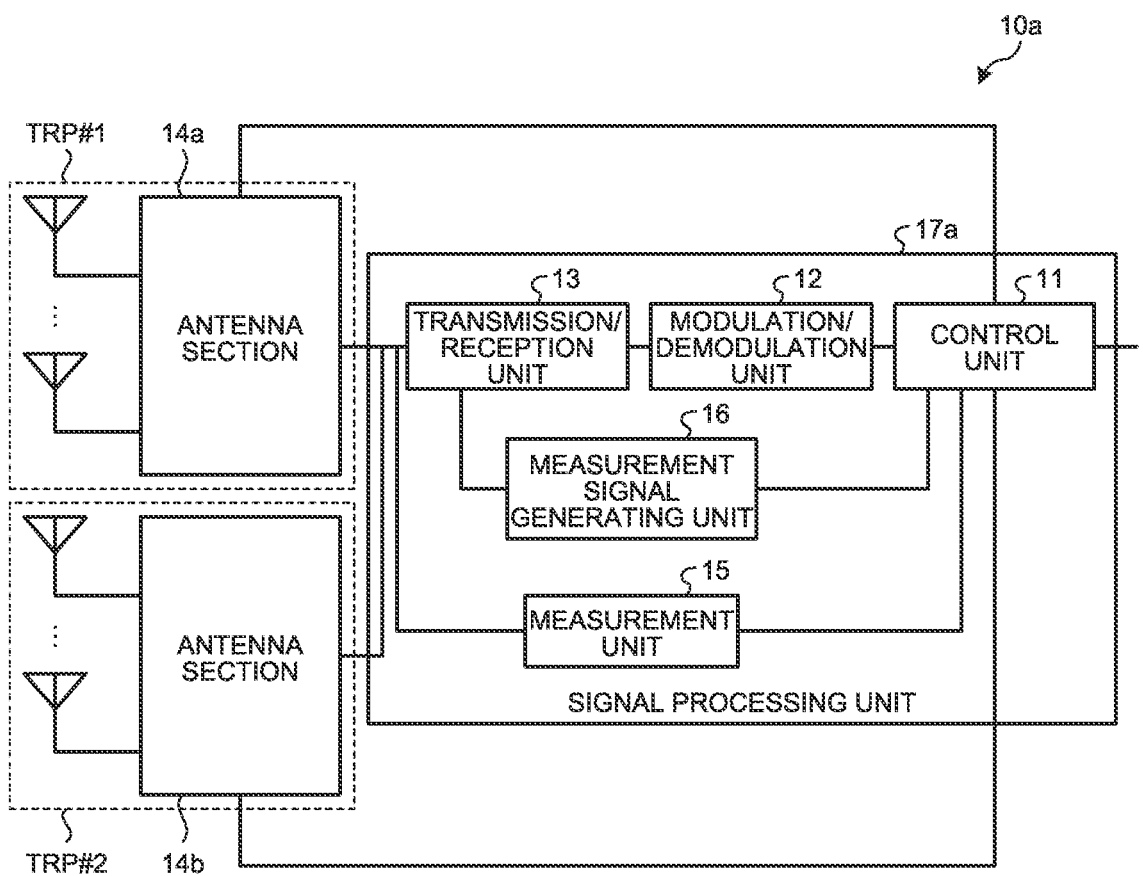
FIG. 16 is a diagram illustrating an example of a configuration of a radio base station according to the second embodiment.

Next, a configuration of the radio base station 10a will be described. FIG. 16 is a diagram illustrating an example of a configuration of the radio base station 10a according to the second embodiment. The radio base station 10a includes a signal processing unit 17a, and antenna sections 14a and 14b. The signal processing unit 17a corresponds to the signal processing unit 17 of the first embodiment illustrated in FIG. 6 but additionally includes a measurement signal generating unit 16. The measurement signal generating unit 16 generates a measurement signal, that is specifically, an SS or a CSI-RS as described above, in accordance with an instruction from the control unit 11. In the radio base station 10a, the control unit 11 further causes the measurement signal generating unit 16 to generate an SS or a CSI-RS to enable grouping of a plurality of terminal transmission beams at the wireless terminal 20a in units of base station antenna sections by which the signals are to be received in the radio base station 10a, in addition to the operation explained in the first embodiment. The control unit 11 indicates the directions of the base station transmission beams to the antenna sections 14a and 14b for transmission of the SS or the CSI-RS. The control unit 11 also generates control information containing the information on the association between the TRP group IDs and the base station transmission beams illustrated in FIG. 14, and notifies the wireless terminal 20a of the control information via the modulation/demodulation unit 12, the transmission/reception unit 13, and the antenna section 14a.

Figure 17:
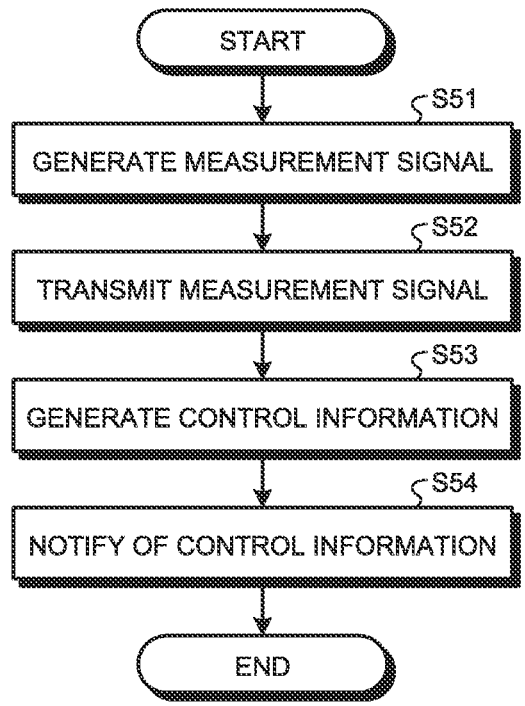
FIG. 17 is a flowchart illustrating an operation of transmitting a measurement signal and control information to a wireless terminal that groups terminal reception beams in the radio base station according to the second embodiment.

Operation of the radio base station 10a will be explained. FIG. 17 is a flowchart illustrating an operation of transmitting a measurement signal and control information to the wireless terminal 20a that groups terminal reception beams, in the radio base station 10a according to the second embodiment. The control unit 11 causes the measurement signal generating unit 16 to generate a measurement signal, that is specifically, an SS or a CSI-RS as described above. The measurement signal generating unit 16 generates a measurement signal (step S51). The measurement signal generating unit 16 outputs the measurement signal to each of the antenna sections 14a and 14b via the transmission/reception unit 13. The control unit 11 also determines the directions of base station transmission beams, and indicates the directions of the base station transmission beams to the antenna sections 14a and 14b. The antenna sections 14a and 14b generate a plurality of base station transmission beams on the basis of the instruction from the control unit 11, and transmit the measurement signal, which is acquired from the measurement signal generating unit 16 via the transmission/reception unit 13, by using each of the base station transmission beams in the directions of the base station transmission beams as indicated by the control unit 11 (step S52). The control unit 11 also generates control information containing the information on the association between the TRP group IDs and the base station transmission beams (step S53). The control unit 11 notifies the wireless terminal 20a of the control information via the modulation/demodulation unit 12, the transmission/reception unit 13, and the antenna section 14a (step S54). Note that the operations of the radio base station 10a when a wireless terminal 20a to which a PUSCH is to be assigned is selected, are similar to those of the radio base station 10 in the first embodiment illustrated in FIG. 8.

Figure 18:
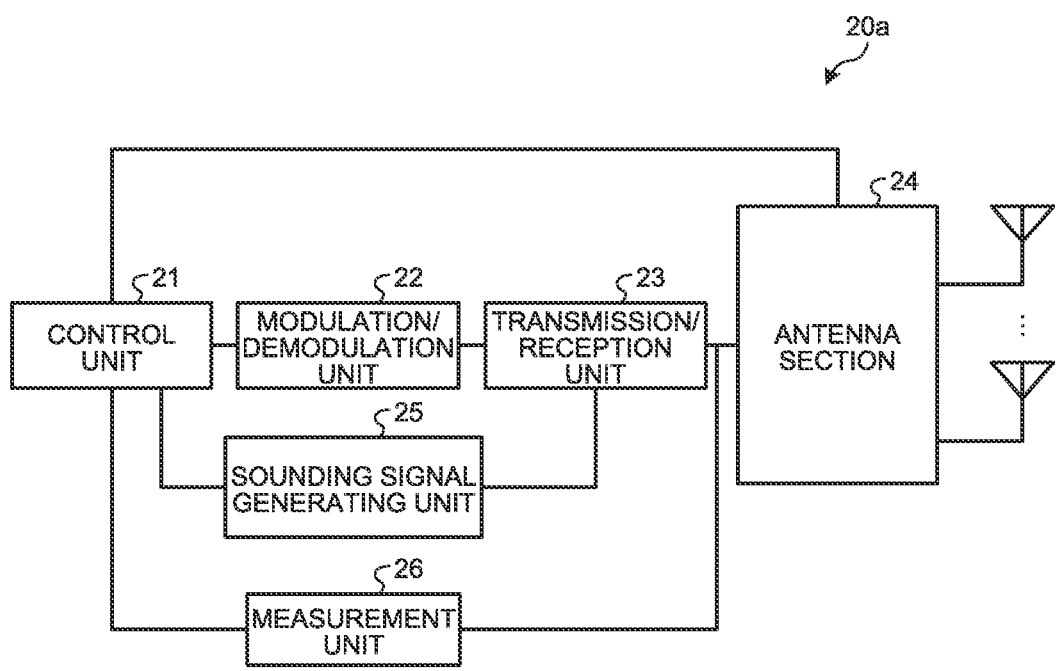
FIG. 18 is a diagram illustrating an example of a configuration of the wireless terminal according to the second embodiment.

Next, a configuration of the wireless terminal 20a will be described. FIG. 18 is a diagram illustrating an example of a configuration of the wireless terminal 20a according to the second embodiment. The wireless terminal 20a corresponds to the wireless terminal 20 of the first embodiment illustrated in FIG. 9 but additionally includes a measurement unit 26. The measurement unit 26 measures the reception quality, the reception power, or the like of a measurement signal received using each terminal reception beam acquired from the antenna section 24 to generate the association between the base station transmission beams and the terminal reception beams as illustrated in FIG. 15. Specifically, the measurement unit 26 measures, for each of the terminal reception beams, the reception quality, the reception power, or the like when measurement signals transmitted from the radio base station 10a are received by using the terminal reception beams generated by the antenna section 24. The measurement unit 26 notifies the control unit 21 of the result of measurements. Upon receiving the result of measurements, the control unit 21 generates the map illustrated in FIG. 15. The control unit 21 acquires control information on the association between the TRP group IDs and the base station transmission beams as illustrated in FIG. 14 separately from the radio base station 10a, and finally determines the association between the TRP group IDs and the terminal transmission beams.

Figure 19:
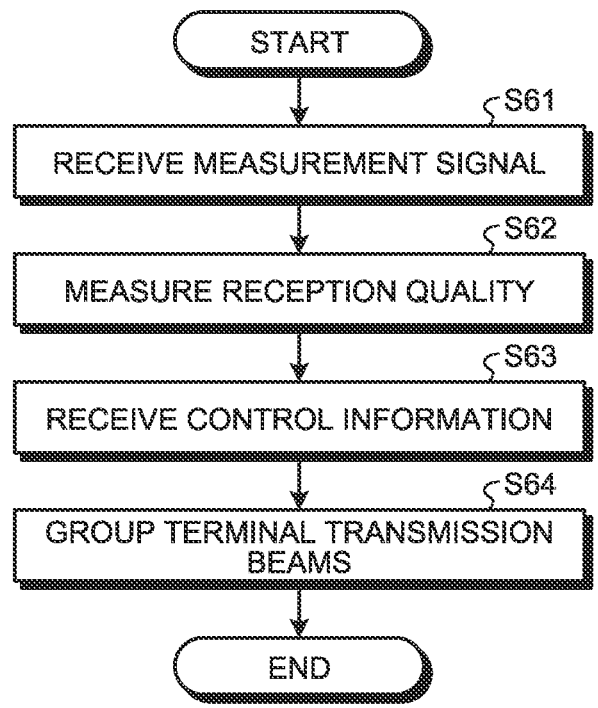
FIG. 19 is a flowchart illustrating an operation of grouping terminal transmission beams of a wireless terminal in the wireless terminal according to the second embodiment.

Operation of the wireless terminal 20a will be explained. FIG. 19 is a flowchart illustrating an operating of grouping terminal transmission beams of the wireless terminal 20a at the wireless terminal 20a according to the second embodiment. For measurement of the reception quality of measurement signals transmitted from the radio base station 10a, the control unit 21 instructs the directions of the terminal reception beams to the antenna section 24 and causes the antenna section 24 to receive the measurement signals from the radio base station 10a (step S61). The measurement unit 26 receives the received signals from the antenna section 24, and measures the reception quality, that is specifically, the SINR as described above (step S62). The measurement unit 26 reports the reception quality, that is, the result of measurements of the SINR to the control unit 21. In addition, the antenna section 24 receives control information containing the information on the association between the TRP group IDs and the base station transmission beams from the radio base station 10a (step S63). The antenna section 24 outputs the received control information to the control unit 21 via the transmission/reception unit 23 and the modulation/demodulation unit 22. The control unit 21 groups the terminal transmission beams of the wireless terminal 20a on the basis of the acquired result of measurements and the control information (step S64). In this manner, the control unit 21 selects, for each terminal reception beam, a base station transmission beam of the radio base station 10a used for transmission of the measurement signal received by the terminal reception beam on the basis of the reception quality. The control unit 21 groups the terminal transmission beams associated with the terminal reception beams in units of base station antenna sections of the radio base station on the basis of the terminal reception beams, for which base station transmission beams generated by the same base station antenna section of the radio base station 10a are selected. Note that the operations of the wireless terminal 20a when a PUSCH is assigned to the wireless terminal 20a by the radio base station 10a, are similar to those of the wireless terminal 20 in the first embodiment illustrated in FIG. 11.

Regarding the hardware configuration of the radio base station 10a, the measurement signal generating unit 16 included in addition to the radio base station 10 of the first embodiment is implemented by the processor 31 illustrated in FIG. 12 and programs stored in the memory 32 illustrated in FIG. 12. In addition, regarding the hardware configuration of the wireless terminal 20a, the measurement unit 26 included in addition to the wireless terminal 20 of the first embodiment is implemented by the receiver 34 illustrated in FIG. 12.

As described above, according to the present embodiment, in the case where beam correspondence is satisfied in both of the radio base station 10a and the wireless terminal 20a, the wireless terminal 20a groups the terminal transmission beams. In this case as well, the same effects as those in the first embodiment are produced.

Third Embodiment

While the radio base station 10 transmits transmission power control commands correspondingly associated with TRP groups at the same time to the wireless terminal 20 in the first embodiment, the transmission power control commands need not necessarily be transmitted at the same time. In a third embodiment, a case where the radio base station 10 transmits transmission power control commands one by one, each command being associated with one TRP group at timings different from each other will be explained. Although this case is also applicable to the radio base station 10a of the second embodiment, an example of application to the radio base station 10 of the first embodiment will be explained because the operations in the second embodiment are similar to those in the first embodiment.

In the third embodiment, only one definition of a transmission power control command "TPC command for scheduled PUSCH" is sufficient, and the radio base station 10 alternatively notifies the wireless terminal 20 of the TRP group ID, to which the TPC command for scheduled PUSCH is to be applied. Specifically, information on a TRP group ID is added to any region defined in a message of the aforementioned Format 0_1. The format to which the information of the TRP group ID is added will be referred to as Format 0_1EE, for example. The radio base station 10 generates a message containing "TRP group ID=#1" and "TPC command for scheduled PUSCH=−1 [dB]" by using the Format 0_1EE, and notifies the wireless terminal 20 of the message at a first timing, for example. In addition, the radio base station 10 generates a message containing "TRP group ID=#2" and "TPC command for scheduled PUSCH=+1 [dB]" by using the Format 0_1EE, and notifies the wireless terminal 20 of the message at a second timing, for example. Specifically, in the radio base station 10, the control unit 11 performs an operation of notifying the wireless terminal 20 of a transmission power control value in units of TRP groups at different transmission timings for different TRP groups. Note that the operations such as determination on the association between the TRP group IDs and the terminal transmission beams in the radio base station 10 are similar to those in the first embodiment.

Upon acquiring "TRP group ID" and "transmission power control command" through the message of the Format 0_1EE, the wireless terminal 20 accumulates the transmission power control command values for each group of terminal transmission beams. Although the difference from the first embodiment lies in that the wireless terminal 20 acquires a message for each TRP group ID, the operation of accumulating the transmission power control command values after acquisition of the message of the Format 0_1EE is similar to that in the first embodiment.

Note that the radio base station 10 can perform transmission power control only on TRP groups the SINR, which is reception quality, of which has not reached the proper SINR value, instead of controlling transmission power for all the TRP groups. In a case where TRP #1 and TRP #2 are present and the SINR of TRP #1 has not reached the proper SINR value while that of TRP #2 has reached the proper SINR value, for example, the radio base station 10 notifies the wireless terminal 20 of a transmission power control command for TRP #1 only. Specifically, in the radio base station 10, the control unit 11 performs an operation of notifying the wireless terminal 20 of a transmission power control value for the TRP group for which the transmission power needs to be changed.

In addition, in a case where control for increasing the transmission power is needed for all of a plurality of TRP groups but it is determined that the increase in the transmission power for all the TRP groups will result in an excess of the transmission power of the wireless terminal 20 over maximum transmission power, the radio base station 10 can select one or more TRP groups that are more important, and increase the transmission power for the selected TRP group(s). In this case, the radio base station 10 notifies the wireless terminal 20 of a transmission power control command for the selected TRP group only. The method for selecting a more important TRP group in the radio base station 10 may be selecting a TRP associated with a base station reception beam with the lowest SINR, for example. Note that a mechanism for the wireless terminal 20 to periodically notify the radio base station 10 of a difference between the maximum transmission power and the current transmission power is already defined in the NR standard. Thus, the radio base station 10 is capable of easily determining whether the transmission power of the wireless terminal 20 exceeds the maximum transmission power. The radio base station 10 may change the number of TRP groups to be selected on the basis of the difference between the maximum transmission power and the current transmission power of the wireless terminal 20. Specifically, in the radio base station 10, in a case where the transmission power of the wireless terminal 20 exceeds the maximum transmission power if the transmission power is increased for a plurality of TRP groups, the control unit 11 performs an operation of notifying the wireless terminal 20 of a transmission power control value for some TRP group(s) selected from a plurality of TRP groups.

As described above, according to the present embodiment, the radio base station 10 notifies the wireless terminal 20 of a plurality of transmission power control commands one by one, the commands being associated with a plurality of TRP groups, at a timing different from each other. Thus, in a case where the number of TRP groups is large, the radio base station 10 is capable of reducing the increase in the number of control bits necessary for one transmission of a transmission power control command.

In addition, the radio base station 10 notifies the wireless terminal 20 of a transmission power control command only for one or more TRP groups the SINR of each of which has not reached the proper SINR value. This enables the radio base station 10 to reduce the overhead of control for TRP groups on which the control need not be performed.

In addition, in a case where the transmission power of the wireless terminal 20 exceeds the maximum transmission power if the transmission power is increased for a plurality of TRP groups, the radio base station 10 selects one or more important TRP groups, and performs control of increasing the transmission power for the selected TRP group(s) only. Thus, the radio base station 10 is capable of preventing the transmission power of the wireless terminal 20 from exceeding the maximum transmission power and making the SINR for a TRP on which control is needed closer to the proper value.

Fourth Embodiment

In the first to third embodiments, the radio base station controls the transmission power of the wireless terminal always in units of TRP groups. In a fourth embodiment, a case where the radio base station 10 performs transmission power control in units of TRP groups or transmission power control in common for all the TRP groups depending on conditions, will be explained. Although this case is also applicable to the radio base station 10a of the second embodiment and to the radio base station 10 and the radio base station 10a of the third embodiment, an example of application to the radio base station 10 of the first embodiment will be explained because the operations in the second and third embodiments are similar to those in the first embodiment.

Figure 20:
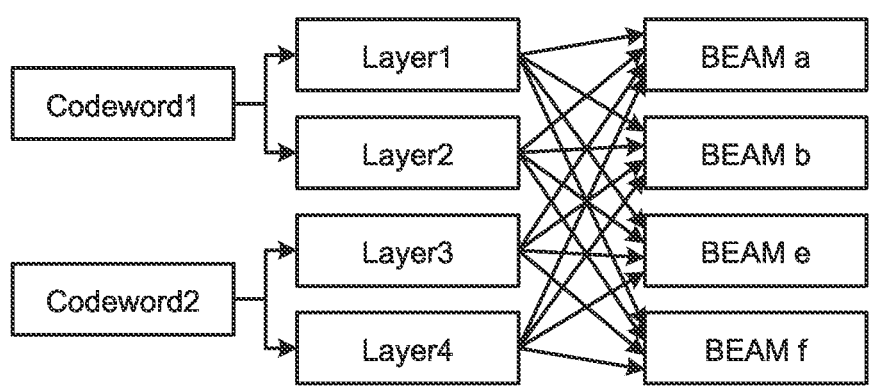
FIG. 20 is a diagram illustrating an example of a mapping pattern in which a wireless terminal according to a fourth embodiment maps one codeword in all the terminal transmission beams to be used for transmission.
Figure 21:
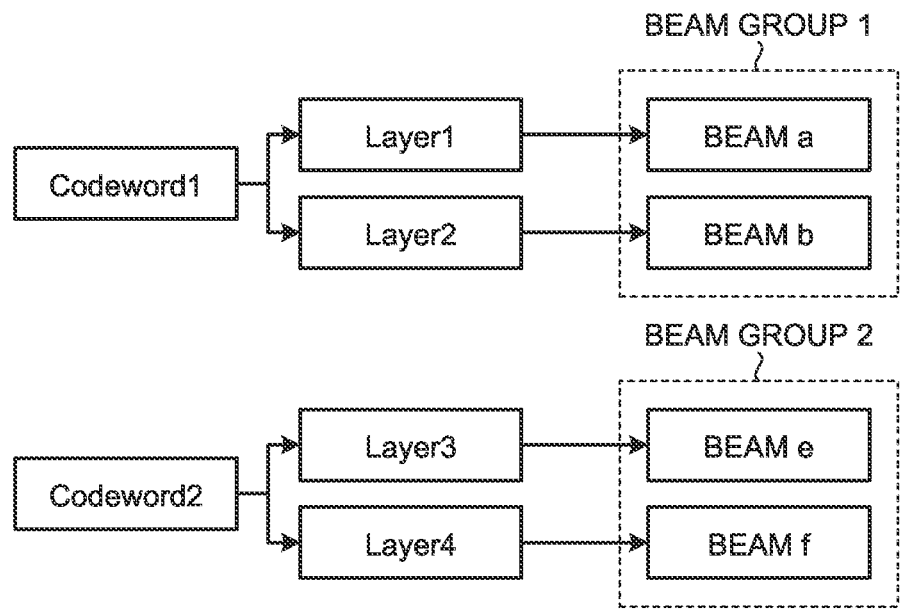
FIG. 21 is a diagram illustrating an example of a mapping pattern in which the wireless terminal according to the fourth embodiment maps one codeword in units of terminal transmission beams.

For example, in the wireless terminal 20, when a data unit that is a section in transmitting or retransmitting a signal is a codeword, there are a method of mapping one codeword to all the terminal transmission beams used for transmission and a method of mapping in units of terminal transmission beams or beam groups. FIG. 20 is a diagram illustrating an example of a mapping pattern in which the wireless terminal 20 according to the fourth embodiment maps one codeword in all the terminal transmission beams to be used for transmission. In addition, FIG. 21 is a diagram illustrating an example of a mapping pattern in which the wireless terminal 20 according to the fourth embodiment maps one codeword in units of terminal transmission beams. The pattern illustrated in FIG. 20 will be referred to as a mapping pattern A, and the pattern illustrated in FIG. 21 will be referred to as a mapping pattern B. The wireless terminal 20 maps one codeword into a plurality of layers in accordance with a mapping pattern defined in the NR standard. Furthermore, for mapping from each of the layers to beams, the wireless terminal 20 uses a technology called precoding. In the NR standard, beams are called antenna ports. Beams illustrated in FIGS. 20 and 21 correspond to the terminal transmission beams in the first to third embodiments. The wireless terminal 20 performs a matrix operation on a signal of each layer, and maps the operation result to the beams. Note that examples of a matrix used for the matrix operation of precoding are described in Chapter 6.3.1.5 of 3GPP specification TS 38.211 V15.0.0.

Note that, the mapping pattern A is selected or the mapping pattern B is selected depending on the matrix used in the wireless terminal 20. First, assume a case where the mapping pattern A illustrated in FIG. 20 is selected in the wireless terminal 20, a signal is transmitted by beams a and b toward the TRP #1, and a signal is transmitted by beams e and f toward the TRP #2. Even when a condition as illustrated in FIG. 5, for example, occurs at the TRPs #1 and #2 in the radio base station 10 that receives the signal, there is no problem just as long as the SINR at the TRP #1 and the TRP #2 have reached the proper SINR value if interference with other radio base stations need not be considered. In such a case, it is sufficient that the radio base station 10 controls the wireless terminal 20 with one transmission power control command as in the related art. For example, such a case where no other radio base station using the same frequency is present around the radio base station 10 can be assumed. In contrast, in a case where interference with another radio base station needs to be considered, when the condition as illustrated in FIG. 5 occurs at the TRPs #1 and #2, the radio base station 10 preferably performs transmission power control on the wireless terminal 20 in units of TRP groups. In such a case, the radio base station 10 selects the mapping pattern B as the pattern to be used by the wireless terminal 20, and performs transmission power control in units of TRP groups if the wireless terminal 20 has transmitted a signal toward the TRP #1 by using beam group 1 and a signal toward the TRP #2 by using beam group 2.

The radio base station 10 determines whether to use the mapping pattern A or the mapping pattern B, that is, whether to perform transmission power control in units of groups or in common for all the groups on the basis of whether interference with another radio base station is present. The NR standard states that the radio base station 10 notifies the wireless terminal 20 of the result of determination on which of the mapping patterns A and B is selected by using "precoding information" in the Format 0_1. In this manner, when the transmission power control of the wireless terminal 20 is to be performed for each TRP group in view of the condition of communication with the wireless terminal 20, the radio base station 10 uses the Format 0_1E described in the first embodiment or the Format 0_1EE described in the second embodiment. When the transmission power control of the wireless terminal 20 is to be performed in common for all the TRP groups, the radio base station 10 uses the existing Format 0_1. In this manner, the radio base station 10 is capable of using two modes. In addition, a method in which the radio base station 10 determines either one mode to be always used, and notifies the wireless terminal 20, with which the radio base station 10 is to communicate, of the mode only once when starting the communication can be considered.

Figure 22:
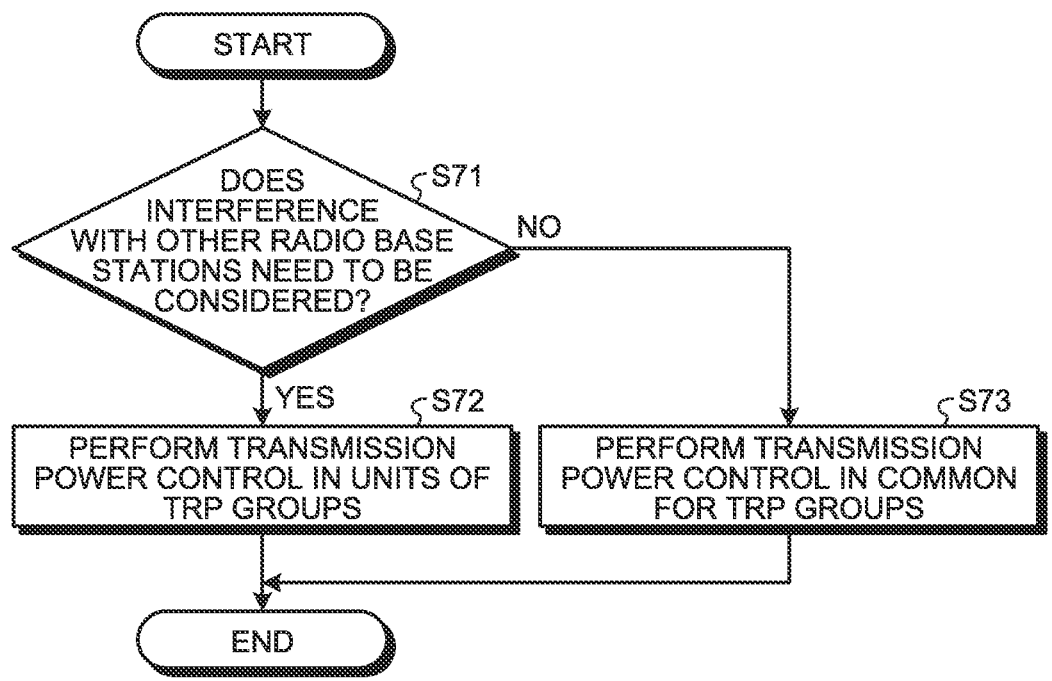
FIG. 22 is a flowchart illustrating an operation of determining a transmission power controlling method for a wireless terminal in the radio base station according to the fourth embodiment.

FIG. 22 is a flowchart illustrating an operation of determining a transmission power controlling method for the wireless terminal 20 in the radio base station 10 according to the fourth embodiment. In a case where transmission power control of the wireless terminal 20 is needed, when interference with another radio base station needs to be considered (step S71: Yes), the control unit 11 determines that transmission power control in units of TRP groups is effective, and determines to control the transmission power of the terminal transmission beams of the wireless terminal 20 in units of TRP groups (step S72). When interference with another radio base station need not be considered (step S71: No), the control unit 11 determines that the transmission power control in units of TRP groups is not necessary, and determines to control the transmission power of the terminal transmission beams of the wireless terminal 20 in common for the TRP groups (step S73).

As described above, according to the present embodiment, the radio base station 10 performs transmission power control in common for the TRP groups when interference with another radio base station need not be considered, and performs transmission power control in units of TRP groups when interference with another radio base station needs to be considered. This enables the radio base station 10 to appropriately control the reception quality such as the SINR for each TRP group by performing the transmission power control in units of TRP groups where necessary, and to reduce the overhead of control of the entire system when the transmission power control in common for the TRP groups is sufficient.

While the terminal transmission beams are grouped in units of TRPs in the first to third embodiments, the grouping method is not limited to that in units of TRPs. For example, when signals transmitted by the terminal transmission beams are received, the radio base station may group the terminal transmission beams of the wireless terminal in view of similarity in reception quality or difference in reception quality.

The configurations presented in the embodiments above are examples of the present invention, and can be combined with other known technologies or can be partly omitted or modified without departing from the scope of the present invention.

A radio base station according to the present invention produces an effect of controlling transmission powers of signals transmitted by a wireless terminal in units of locations at which the signals are received in a case where signals from a wireless terminal can be received at a plurality of locations.

What is claimed is:

1. A wireless terminal that performs radio communication with a radio base station including a plurality of base station antenna devices, the wireless terminal comprising:
   a terminal antenna device to generate terminal transmission beams, and transmit measurement signals to the radio base station by using the terminal transmission beams;
   a processor, and
   a memory to store a program which, when executed by the processor, performs operations of:
   generating the measurement signals which are signals for measurement of reception quality at the radio base station,
   receiving control information from the radio base station in units of groups of the base station antenna sections of the radio base station, at which at least some of the measurement signals transmitted by the terminal transmission beams are received, the control information indicating association between at least some of the terminal transmission beams and the base station antenna devices of the radio base station based on the measurement signals,
   determining transmission power of the terminal transmission beams on the basis of an instruction from the radio base station which is included in the control information, in units of groups of the base station antenna sections corresponding to the control information.

2. The wireless terminal according to claim 1, wherein
   the processor generates the measurement signal on the basis of an instruction from the radio base station, and
   the terminal antenna device generates terminal transmission beams on the basis of the instruction from the processor, and transmits the measurement signal to the radio base station.

3. A control circuit to control a wireless terminal that performs radio communication with a radio base station including a plurality of base station antenna devices, to perform operations of:
   generating measurement signals for measurement of reception quality at the radio base station,
   causing a terminal antenna device to generate terminal transmission beams, and transmit the measurement signals to the radio base station by using the terminal transmission beams; and
   receiving control information from the radio base station in units of groups of the base station antenna sections of the radio base station, at which at least some of the measurement signals transmitted by the terminal transmission beams are received, the control information indicating association between at least some of the terminal transmission beams and the base station antenna devices of the radio base station based on the measurement signals, determining transmission power of the terminal transmission beams on the basis of an instruction from the radio base station which is included in the control information, in units of groups of the base station antenna sections corresponding to the control information.

4. A non-transitory program storage medium storing a program for causing a wireless terminal, which performs radio communication with a radio base station including a plurality of base station antenna devices, to perform:

generating measurement signals for measurement of reception quality at the radio base station, controlling a terminal antenna device to generate terminal transmission beams, and transmit the measurement signals to the radio base station by using the terminal transmission beams; and receiving control information from the radio base station in units of groups of the base station antenna sections of the radio base station, at which at least some of the measurement signals transmitted by the terminal transmission beams are received, the control information indicating association between at least some of the terminal transmission beams and the base station antenna devices of the radio base station based on the measurement signals, determining transmission power of the terminal transmission beams on the basis of an instruction from the radio base station which is included in the control information, in units of groups of the base station antenna sections corresponding to the control information.

\* \* \* \* \*